July 7, 1959
G. E. FLINN
2,893,261
TRANSMISSION
Filed Feb. 6, 1956
5 Sheets-Sheet 1
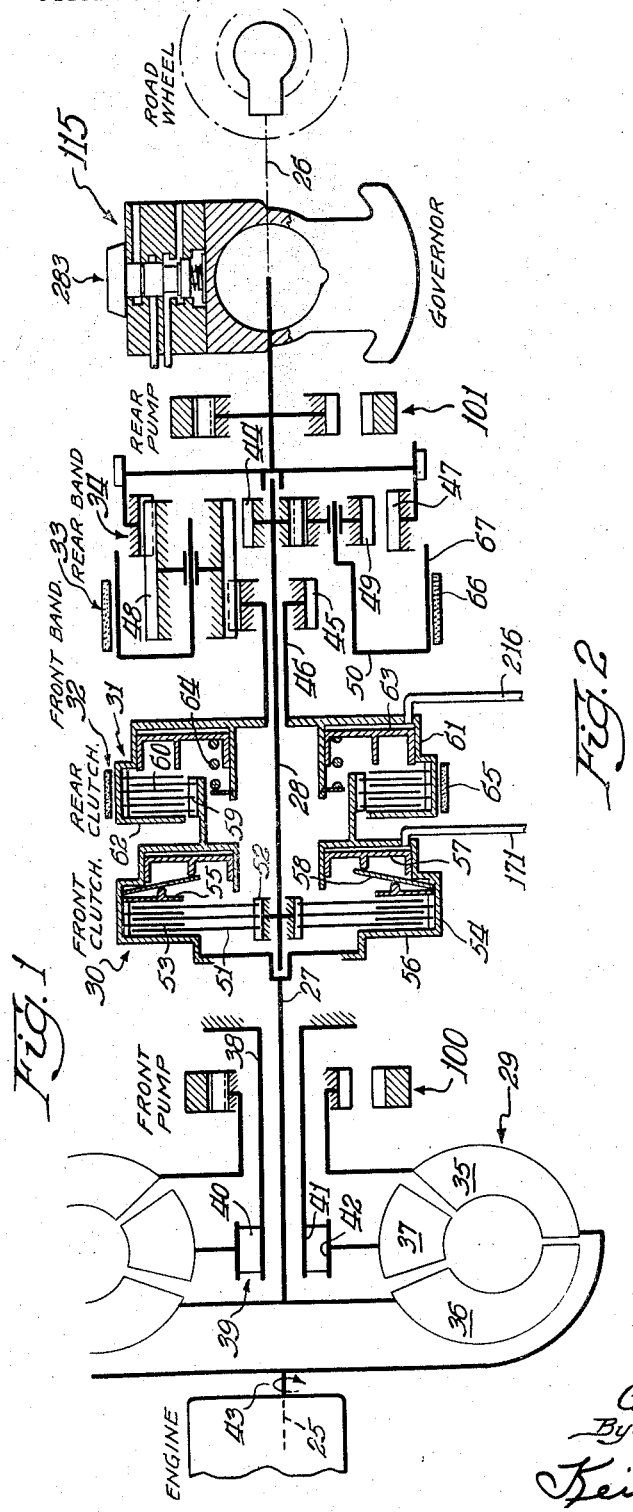
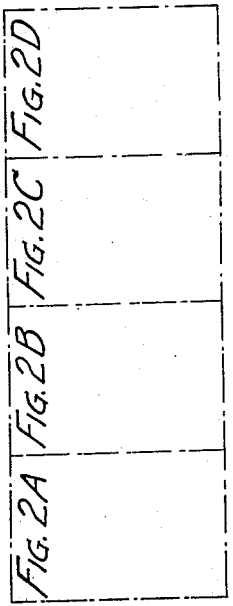
Inventor:
George E. Flinn
By: Keith T. Blew Atty.

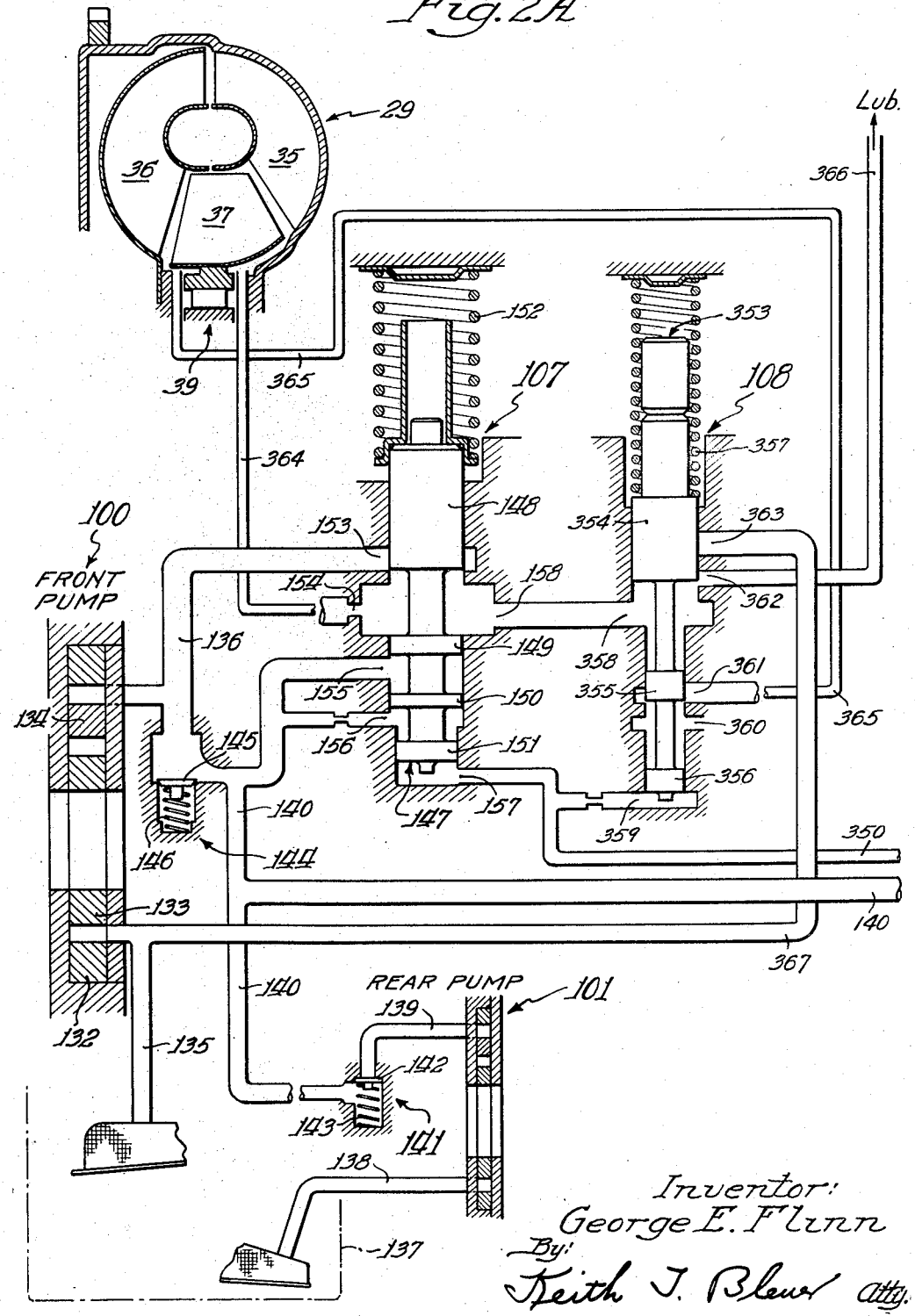

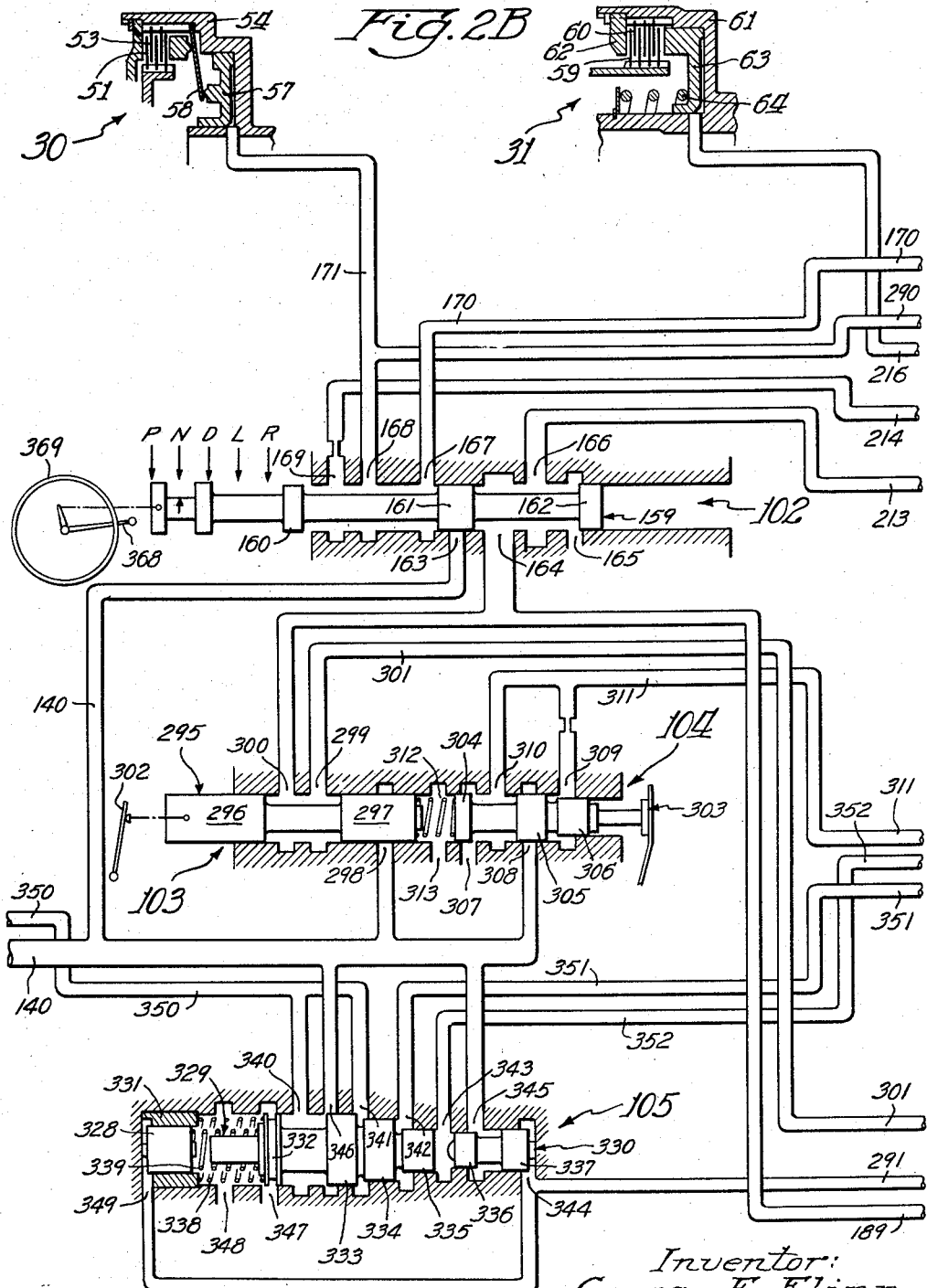

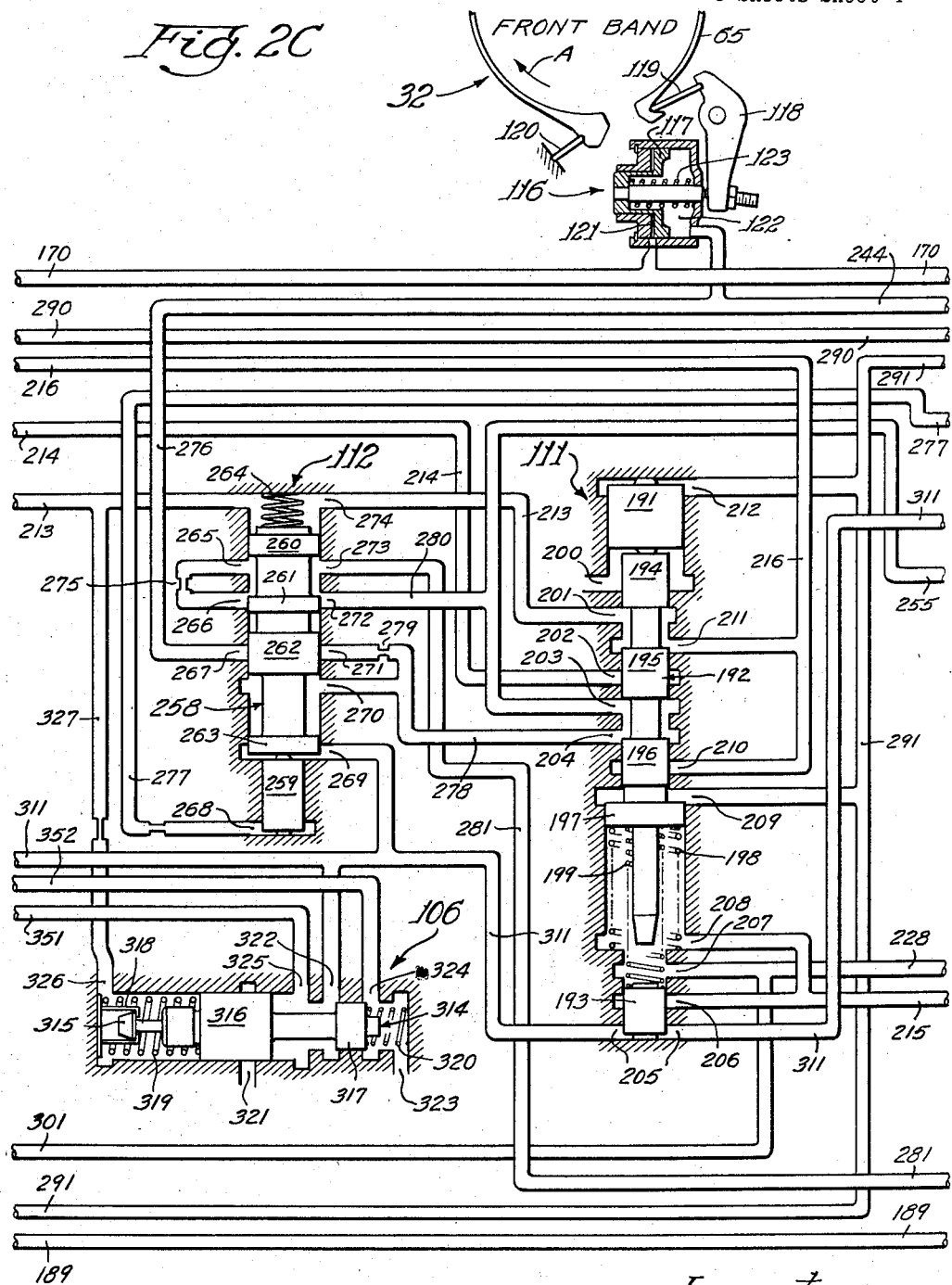

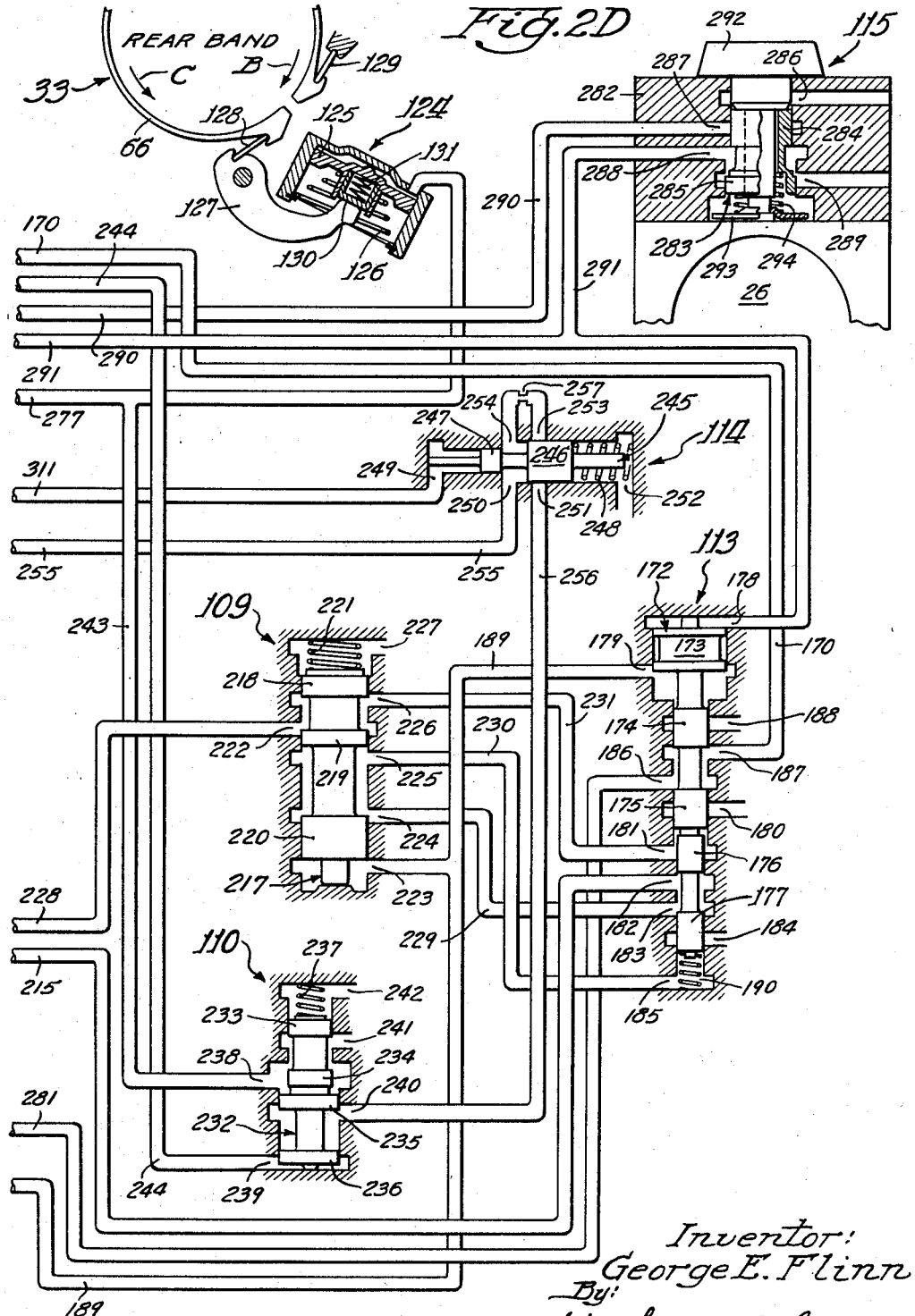

United States Patent Office 2,893,261
Patented July 7, 1959

2,893,261
TRANSMISSION

George E. Flinn, Muncie, Ind., assignor to Borg-Warner Corporation, Chicago, Ill., a corporation of Illinois Application February 6, 1956, Serial No. 563,518

9 Claims. (Cl. 74—472)

My invention relates to transmissions for automotive vehicles and more particularly to hydraulic controlling mechanisms for such transmissions.

It is an object of the present invention to provide improved automatic hydraulic transmission controls which include a hydraulic governor providing a governor output fluid pressure that increases with the speed of the driven shaft of the transmission effective on a plurality of shift valves for providing a plurality of different upshifts in the transmission, the governor being so constructed that the governor output pressure increases gradually over the whole range of driven shaft speeds so that the single governor can be used on the plurality of shift valves.

It is also an object of the invention to provide hydraulic control mechanisms for various fluid pressure engaged power train completing friction devices which cushion the engagement of these devices, so that changes in transmission speed ratio are made with no substantial shock. In particular, it is an object to provide fluid restricting valve mechanism for impeding the flow of fluid pressure to a fluid pressure operated motor for a friction brake that completes a low speed power train through the transmission, the valve mechanism being effectively controlled by the accelerator of the vehicle so that it is effective when the accelerator is in a closed throttle position.

It is another object of the invention to effectively control and change the shift points of one of the above mentioned shift valves with respect to the speed of the driven shaft of the transmission. It is desirable that one of the shift valves, particularly the valve controlling the shift between the two lowest speed ratios, downshift at a higher speed of the driven shaft under manual control of a selector lever mounted beneath the steering wheel of the vehicle as compared to the speed of the driven shaft at which a downshifting movement of the shift valve occurs when the accelerator is moved to an open throttle kickdown position. In this connection, it is an object to provide a control valve under the control of the selector lever mounted beneath the steering wheel which puts a fluid pressure on a relatively small land of the shift valve in one position of the control valve and which is shifted to alternately put a fluid pressure on a relatively large land, the fluid pressure on these lands acting against a governor controlled fluid pressure also effective on the valve and tending to move the valve against the governor pressure into its downshifted position with different forces depending on which land the fluid pressure is applied.

It is also an object to provide an improved shift valve for automatic speed ratio changes having a throttle controlled pressure tending to move the valve in one direction and a governor controlled pressure tending to move the valve in the opposite direction, the valve being so arranged that the throttle pressure is cut off with respect to the valve when the valve moves into its high speed position to perform a latching function in which the valve is yieldably held in its high speed position. It is also an object of the invention to provide in connection with one of the automatic shift valves a pressure reducer valve that effectively is between accelerator controlled valve means providing a throttle pressure, the reducer valve functioning to reduce by a predetermined amount the throttle pressure as it is transmitted to the one shift valve tending to move it into its down-shifted position, and to provide an interconnection between two such shift valves so that this reduced throttle pressure is also applied to the other shift valve so that the necessity for a second throttle pressure reducing valve is obviated.

The invention consists of the novel constructions, arrangements and devices to be hereinafter described and claimed for carrying out the above stated objects and such other objects as will be apparent from the following description of a preferred form of the invention, illustrated with reference to the accompanying drawings, wherein:

Fig. 1 is a diagrammatic view of a transmission with which my improved controls may be used;

Fig. 2 is a diagram indicating the manner in which Figs. 2A, 2B, 2C and 2D may be placed together in order to form a showing of a complete hydraulic transmission control system embodying the principles of the invention; and Figs. 2A, 2B, 2C and 2D are diagrammatic showings of parts of the hydraulic control mechanism and which may be placed together in the manner illustrated in Fig. 2.

Like characters of reference designate like parts in the several views.

The transmission with which my improved hydraulic controls are adapted to cooperate, referring to Fig. 1 in particular, may be seen to comprise a drive shaft 25, a driven shaft 26 and intermediate shafts 27 and 28. The shaft 25 may be the usual crank shaft of the vehicle engine, and the shaft 26 may be connected with the usual driving road wheels of the vehicle by any suitable well-known power transmitting mechanism. The shafts 27 and 28 are in effect piloted with respect to the shafts 25 and 26. The transmission comprises, in general, a hydraulic torque converter 29, hydraulically operated friction clutches 30 and 31, hydraulically operated friction brakes 32 and 33 and a planetary gear set 34.

The hydraulic torque converter 29 comprises a vaned impeller element 35, a vaned rotor or driven element 36 and a vaned stator or reaction element 37. The impeller 35 is driven from the drive shaft 25, and the rotor 36 is fixed to the intermediate shaft 27. The stator 37 is rotatably disposed on a stationary sleeve 38, and a one-way brake 39 is disposed between the stator and the sleeve 38. The one-way brake 39 may be of any suitable construction, and, in the illustrated embodiment, comprises a plurality of tiltable sprags 40 disposed between an inner race surface 41 fixed with respect to the sleeve 38 and an outer race surface 42 fixed with respect to the stator 37. The one-way brake 39 is so arranged as to allow a free rotation of the stator 37 in the forward direction, that is, in the same direction in which the drive shaft rotates and which is indicated by the arrow 43 and prevents a rotation of the stator in the reverse direction.

The torque converter 29 functions in a manner well-known for such torque converters for driving the rotor or driven element 36 at an increased torque with respect to the torque impressed on the impeller 35 of the converter. The vanes of the stator 37 function to change the direction of flow of fluid between the rotor and impeller so as to provide this increased torque on the driven element 36. In this case, the reaction on the stator 37 is in the direction reverse of the rotation of the drive shaft 25, so that the one-way brake 39 engages and prevents rotation of the stator in this direction. When the speed of the driven element or rotor 36 reaches a predetermined value, the reaction on the vanes on the stator 37 changes in direction, tending to rotate the stator in the forward direction, and the brake 39 releases and allows such rotation of the stator. In this case, the torque converter 29 functions as a simple fluid coupling which drives the rotor 36 at substantially the same speed and with no increase in torque with respect to the impeller 35.

The planetary gear set 34 comprises a sun gear 44 which is fixed on the shaft 28, a second sun gear 45 fixed on a sleeve portion 46 which is rotatable on the shaft 28, a ring gear 47 fixed with respect to the driven shaft 26, a plurality of planet gears 48, a plurality of planet gears 49, and a planet gear carrier 50. Each planet gear 48 and each of the planet gears 49 is rotatably disposed in the carrier 50. The carrier 50 is rotatably disposed with respect to the shaft 28 and the shaft portion 46 by any suitable bearings. The planet gears 49 are each in mesh with the sun gear 44 and also with a planet gear 48. The gears 48 are also in mesh with the ring gear 47 and with the sun gear 45.

The clutch 30 is arranged to connect the shaft 27 driven by the rotor 36 with the shaft 28 and the sun gear 44 formed thereon. The clutch 30 comprises clutch discs 51 splined on a hub member 52 which is fixed on the shaft 28. The clutch also comprises clutch discs 53 interleaved between the discs 51 and fixed within a member 54 that is in turn fixed to the shaft 27 so as to be driven by this shaft.

The clutch 30 comprises a movable pressure plate 55 splined within the member 54 and adapted to press the friction discs 51 and 53 together in frictional engagement between it and an enlarged annular part 56 of the shaft 27. An annular piston 57 is provided for actuating the movable pressure plate 55. The pressure from the piston 57 is transmitted to the pressure plate 55 through a spring strut 58 which is in the form of an annular "Belleville" washer. The strut 58 at its inner periphery is acted on by the piston 57 so that its inner periphery moves axially with respect to its outer periphery and moves the pressure plate 55 which is acted on by the strut 58 at intermediate points thereof. The inherent resilient action of the strut 58 functions to return the piston back into its illustrated position when fluid pressure, applied as will be hereinafter described, is released from the piston.

The clutch 31 is arranged to connect the part 54 and thereby the shaft 27 with the shaft portion 46 and the sun gear 45 and comprises clutch discs 59 splined onto the member 54 and clutch discs 60 splined within a member 61 which is fixed to the shaft portion 46. A pressure plate portion 62 is fixed to the member 61 on one side of the clutch discs, and an annular hydraulic piston 63 is provided on the other side of the discs for compressing the discs between it and the pressure plate portion 62. A return spring 64 is provided for acting on the piston 63 and yieldingly holding it in its clutch disapplying position.

The brake 32 comprises a brake band 65 adapted to be contracted on the part 61 for thereby braking the sun gear 45. The brake 33 comprises a brake band 66 adapted to be contracted on a drum portion 67 of the planet gear carrier 50.

In operation, the transmission has a neutral condition and provides low, intermediate and high speed ratios in forward drive and a drive in reverse. The transmission is in neutral condition when the clutches 30 and 31 and the brakes 32 and 33 are disengaged.

The low speed forward drive may be obtained by engaging the clutch 30 and the brake 33. The clutch 30 is engaged by applying fluid pressure to the piston 57. The low speed power train exists from the drive shaft 25 through the torque converter 29, the intermediate shaft 27, the clutch 30, the shaft 28 and the planetary gear set 34 to the shaft 26. The brake 33 is effective on the carrier 50, so that the carrier 50 constitutes the reaction element of the gear set. The shaft 28, driven as just described, drives the sun gear 44 which thus constitutes the driving element of the gear set 34. The drive is transmitted through the planet gears 48 and 49 from the sun gear 44 to the ring gear 47 thus driving the shaft 26 at a reduced speed with respect to the shaft 28. Torque conversion thus takes place in both the hydraulic torque converter 29 and also in the gear set 34, so that the torque with which the shaft 26 is driven is the product of the torque multiplications of the hydraulic torque converter 29 and gear set 34. It will be understood, as above described, however, that the torque conversion produced by the hydraulic torque converter 29 decreases as the speed of its driven element 36 increases, and eventually the torque converter 29 functions as a simple fluid coupling producing no torque conversion within it.

The intermediate speed power train is completed by allowing the clutch 30 to remain engaged and engaging the brake 32 in lieu of the brake 33. The flow of power for the intermediate speed power train is the same as for the low speed power train; however, for the intermediate speed power train, the sun gear 45 is the reaction element of the gear set 34 rather than the carrier 50, the gear 45 for the intermediate speed drive being held stationary by the brake 32. Since there are sets of two planet gears 48 and 49 between the sun gear 44 and the ring gear 47; and the sun gear 45, constituting the reaction element of the gear set 34, is in mesh with the gears 48, the ring gear 47 and thereby the shaft 26 are driven at a reduced speed with respect to the shaft 28 which is, however, higher than for the low speed drive.

The high speed ratio power train is obtained by allowing the clutch 30 to remain engaged and engaging the clutch 31 in lieu of the brake 32. The clutch 31 may be engaged by applying fluid pressure to its piston 63. In this drive, the shaft 27 is driven through the torque converter 29 from the drive shaft 25 as in intermediate speed drive. The shaft 27 is connected to the clutch 30 to drive the sun gear 44 as was the case in intermediate speed drive. The clutch 31 functions to connect the part 54, which in turn is connected to the shaft 27, with the part 61 and thereby with the sun gear 45. Thus both the sun gear 44 and also the sun gear 45 are driven by the shaft 27, and as is well-known in connection with planetary gear sets, when two elements of the gear set are driven at the same speed, the gear set becomes locked up so that all of its gears and elements rotate as a unit, and there is thus a direct drive between the shafts 27 and 26. The converter 29 may be expected to function as a simple fluid coupling, generally, in this drive; and there thus exists a substantially direct drive between the drive shaft 25 of the transmission and its driven shaft 26.

Reverse drive may be obtained through the transmission by engaging the brake 33 and the clutch 31. The power train for this drive is from the drive shaft 25 through the torque converter 29 to the intermediate shaft 27 and from thence through the clutch 31 to the sun gear 45, the planet gears 48 and the ring gear 47 to the driven shaft 26. The brake 33 causes the planet gear carrier 50 to function as the reaction element of the gear set; and since there are only the single planet gears 48 between the sun gear 45 which drives the ring gear 47 which is driven, the ring gear 47 and the shaft 26 will be driven at a reduced speed in the reverse direction with respect to the sun gear 45 and the shaft 27. For this drive, the torque converter generally functions to increase torque; and thus the torque impressed on the shaft 26 is the product of the torque increases by the torque converter 29 and the planetary gear set 34.

Referring now to Figs. 2A, 2B, 2C and 2D, the hydraulic control system for the transmission comprises, in general, a front pump 100, a rear pump 101, a manual valve 102, a downshift valve 103, a throttle valve 104, a compensator valve 105, a throttle modulator valve 106, a main oil pressure regulator valve 107, a low oil pressure regulator valve 108, an inhibitor valve 109, a transition valve 110, a 2–3 shift valve 111, an orifice control valve 112, a 1–2 shift valve 113, a rear servo check valve 114 and a governor valve 115.

The brake 32 is applied by means of a hydraulic motor 116. The motor 116 comprises a piston 117 connected by means of a bell crank 118 and a strut 119 with one end of the brake band 65, the other end of the brake band 65 being held fixed by means of a strut 120. The motor 116 has a brake applying fluid pressure cavity 121 and a brake disapplying fluid pressure cavity 122, and a spring 123 acts on the piston tending to hold it in its brake disapplying position. Fluid pressure supplied to the cavity 121 moves the piston 117 against the spring 123 so as to move one end of the brake band 65 to engage it with the drum 61. It may be noted at this point that the direction of reaction on the sun gear 45 and the drum 61 is in the reverse direction as indicated by the arrow A when the brake 32 is engaged for the intermediate speed ratio power train. This direction is opposite the direction of rotation of the drive shaft 25 indicated by the arrow 43, and the drum 61 in tending to rotate in this direction augments the action of the strut 119 in engaging the band 65 and causes increased band engagement, since the drum 61 tends to carry the end of the band acted on by the strut 119 in the same direction in which this end of the band is urged by the strut 119. It is apparent that the band 65 wraps or is partially self-energizing for this rotative tendency of the drum 61.

The brake 33 is engaged by means of a fluid pressure motor 124 which comprises a piston 125 movable by fluid pressure applied thereto against the action of a spring 126. Motion of the piston 125 is transmitted to one end of the brake band 66 by means of a bell crank 127 and a strut 128, the other end of the brake band 66 being held fixed by means of a strut 129. The bell crank 127 is effectively connected with the piston 125 by means of an accumulator piston 130 and a spring 131 between the pistons 125 and 130. In low speed drive through the transmission, the reaction on the planet gear carrier 50 and on the drum 67 is in the reverse direction as indicated by the arrow B, and this reaction or tendency to rotate tends to unwrap the band 66 with respect to the drum 67. For this direction of reaction, the brake 33 is thus self-deenergizing and provides a less braking effect than for a case in which this reaction did not exist. The reaction on the brake drum 67 for reverse drive is in the forward direction as indicated by the arrow C, that is, in the same direction as the drive shaft 25 rotates. This tendency of the drum 67 to rotate in this direction assists the strut 128 in forcing the movable end of the band 66 to move in the direction indicated by the arrow C, and the brake 33 thus wraps or is self-energizing for this direction of reaction, so that the braking effect is greater than would be the case if there were no tendency for the drum to rotate. The reaction on the drum 67 is greater for reverse drive than for low forward drive, and hence the brake 33 has been constructed to wrap for the reaction for reverse drive instead of that for low speed forward drive.

The pump 100 may be of any suitable fixed displacement type and may comprise an outer gear 132 and an inner gear 133 in mesh with the outer gear and a crescent shaped casing portion 134 between the gears. The gears 132 and 133 carry fluid between their teeth and across the inner and outer surfaces of the casing portion 134 so as to draw fluid from an inlet conduit 135 and discharge it into an outlet conduit 136. The inlet conduit 135 is adapted to draw fluid, such as oil, from a sump 137. The pump 100 is driven directly from the drive shaft 25 through the impeller 35. The pump 101 is of the same construction as the pump 100 and is driven from the driven shaft 26 of the transmission. The pump 101 draws fluid from the sump 137 through an inlet conduit 138 and discharges it into an outlet conduit 139.

A conduit 140 constitutes the supply or line pressure conduit for engaging the power train completing friction clutches and brakes and also for supplying various valves in the transmission control system with fluid pressure. A check valve 141 is disposed in the conduit 140 and comprises a piston 142 yieldably held in its closed position by means of a spring 143. The check valve 141 blocks fluid flow through the conduit 140 to the rear pump 101.

A similar check valve 144 comprising a piston 145 and a spring 146 acting on the piston is provided between the line pressure conduit 140 and the outlet conduit 136 for the front pump 100. The check valve 144 functions to prevent fluid flow from the line pressure conduit 140 to the conduit 136 when the pressure in the latter conduit is lower than in the conduit 140.

The main pressure regulator valve 107 functions to regulate the pressure in the line pressure conduit 140. The valve 107 comprises a piston 147 having lands 148, 149, 150 and 151. A spring 152 is provided for moving the piston 147 downwardly as seen in the figure. The valve 107 comprises ports 153, 154, 155, 156, 157 and 158. The ports 155 and 156 are connected with the line pressure conduit 140, and the port 153 is connected with the outlet conduit 136 of the pump 100. The ports 154 and 158 are permanently connected around the piston 147.

The manual valve 102 functions, in general, to direct the line pressure from the conduit 140 to the various clutch and brake operating pistons and motors and to various valves in the transmission control system in accordance with the various driving conditions desired for the transmission. The manual valve 102 comprises a valve piston 159 having lands 160, 161 and 162; and the valve 102 is provided with ports 163, 164, 165, 166, 167, 168 and 169. The port 163 is connected with the line pressure supply conduit 140; and the port 165 is a bleed port discharging into the sump 137. The port 167 is connected by means of a conduit 170 with the brake apply cavity 121 in the brake motor 116; and the port 168 is connected by means of a conduit 171 with the piston 57 for the clutch 30.

The 1–2 shift valve 113 utilizes line pressure supplied from the manual valve 102 for causing engagement and disengagement of the brakes 32 and 33 for causing changes between first and second speed drives. The 1–2 shift valve comprises a valve piston 172 provided with lands 173, 174, 175, 176 and 177. The 1–2 shift valve comprises ports 178, 179, 180, 181, 182, 183, 184, 185, 186, 187 and 188. The ports 180, 184 and 188 are bleed ports discharging into the sump 137. The port 179 is connected by means of a conduit 189 with the port 164 of the manual valve 159, and the port 187 is connected with the conduit 170 also from the manual valve 102. A spring 190 is provided, acting on the lower end of the piston 172 urging it upwardly.

The 2–3 shift valve 111 also utilizes line pressure supplied from the manual valve 102, and this valve causes engagement and disengagement of the proper clutch and brake (clutch 31 and brake 32) for causing changes between second and third speed drive. The valve 111 comprises pistons 191, 192 and 193. The piston 192 is provided with lands 194, 195, 196 and 197. A spring 198 is disposed between the land 197 and a stationary part for urging the piston 192 upwardly, and a spring 199 is provided between the land 197 and the piston 193. The valve 111 is provided with ports 200, 201, 202, 203, 204, 205, 206, 207, 208, 209, 210, 211 and 212. The port 200 is a bleed port discharging into the sump 137; the port 201 is connected by means of a conduit 213 with the port 166 of the manual valve 102; the port 202 is connected by means of a conduit 214 with the port 169 of the manual valve 102; the ports 206 and 208 are connected by means of a conduit 215 with the port 182 of the 1–2 shift valve; and the ports 210 and 211 are connected by means of a conduit 216 with the piston 63 for the clutch 31.

The inhibitor valve 109, the transition valve 110, the orifice control valve 112 and the rear servo check valve 114 augment the action of the valves 111 and 113 in controlling the changes between the various speed ratios of the transmission. The inhibitor valve 109 cooperates in particular with the 1–2 shift valve 113. The inhibitor valve 109 comprises a piston 217 having lands 218, 219 and 220. A spring 221 yieldably holds the piston 217 in its illustrated position. The valve 109 is provided with ports 222, 223, 224, 225, 226 and 227. The port 227 is a bleed port adapted to discharge into the sump 137; the port 222 is connected by means of a conduit 228 with the port 207 of the valve 111; the port 223 is connected by means of the conduit 189 with the ports 179 and 164 of the valves 113 and 102; the port 224 is connected by means of a conduit 229 with the port 183; the port 225 is connected by means of a conduit 230 with the port 185; and the port 226 is connected by means of a conduit 231 with the port 181; the ports 183, 185 and 181 being parts of the valve 113 as previously described.

The transition valve 110 comprises a piston 232 having lands 233, 234, 235 and 236. A spring 237 acts on the piston 232 yieldably holding it in its illustrated position. The valve 110 is provided with ports 238, 239, 240, 241 and 242. The ports 241 and 242 are bleed ports which discharge into the sump 137. The port 238 is connected by means of a conduit 243 with the piston 125 of the brake motor 124; and the port 239 is connected by means of a conduit 244 with the cavity 122 in the brake motor 116.

The rear servo check valve 114 comprises a piston 245 having lands 246 and 247. A spring 248 acts between a stationary part and the land 246 yieldably holding the piston 245 in its illustrated position. The valve 114 comprises ports 249, 250, 251, 252, 253 and 254. The port 252 is a bleed port discharging into the sump 137; the port 250 is connected by means of a conduit 255 with the port 203 of the valve 111; the port 251 is connected by means of a conduit 256 with the port 240 of the valve 110; and the ports 253 and 254 are connected together by means of a restriction 257.

The orifice control valve 112 comprises pistons 258 and 259. The piston 258 is provided with lands 260, 261, 262 and 263. A spring 264 acts on the piston 258 yieldably holding both pistons 258 and 259 in their illustrated positions. The valve 112 is provided with ports 265, 266, 267, 268, 269, 270, 271, 272, 273 and 274. The ports 265 and 266 are connected together by means of a restriction 275; the port 267 is connected by means of a conduit 276 with the conduit 244 and the cavity 122 of the brake servo motor 116; the port 268 is connected by means of a branch conduit 277 with the conduit 243; the port 270 is connected by means of a conduit 278 with the port 204 of the valve 111; the port 271 is connected by means of a restriction 279 with the port 270 and the conduit 278; the port 272 is connected by means of a branch conduit 280 with the port 203 of the valve 111 and with the conduit 255; the port 273 is connected by means of a conduit 281 with the port 186 of the valve 113; and the ports 274 are connected together and with the conduit 213 and thereby with the ports 201 and 166 of the valves 111 and 102, respectively.

The governor valve 115 comprises a casing 282 which is fixed on the driven shaft 26 and a piston 283 slidably disposed in a cavity within the casing 282. The piston 283 is provided with lands 284 and 285. The governor valve 115 comprises ports 286, 287, 288 and 289. The ports 286 and 289 are bleed ports discharging into the sump 137; the port 287 is connected by means of a branch conduit 290 with the conduit 171 which is in turn connected with the port 168 of the manual valve 102; and the port 288 is connected by means of a governor pressure supply conduit 291 with the port 178 of the 1–2 shift valve and the ports 212 and 209 of the 2–3 shift valve.

A governor weight 292 extends through and is slidably disposed within the governor piston 283. The weight 292 has a spring retainer washer 293 fixed on its inner end, and a spring 294 extends between the retainer washer 293 and an internal shoulder formed with the piston 283 for yieldably holding the weight 292 and the valve piston 283 together in the relative positions in which they are illustrated.

The throttle valve 104, the compensator valve 105 and the throttle modulator valve 106 provide pressures that vary with the position of the accelerator of the vehicle for varying the shift points of the transmission and also varying the pressures that are applied to the various clutches and brakes of the transmission. The throttle valve 104 is under the control of the downshift valve 103. The downshift valve 103 comprises a valve piston 295 having lands 296 and 297. The downshift valve 103 comprises ports 298, 299 and 300. The port 298 is connected with the line pressure supply conduit 140; the port 299 is connected with the conduit 228 by means of a branch conduit 301; and the port 300 is connected to the port 164 of the selector valve 102 and to the conduit 189. The valve piston 295 is under the control of the vehicle accelerator 302 by any suitable connecting mechanism so that when the accelerator 302 is moved toward an open throttle position, it coordinately moves the piston 295 to the right as seen in the drawing.

The throttle valve 104 comprises a piston 303 having lands 304, 305 and 306. The valve 104 comprises ports 307, 308, 309 and 310. The port 307 is a bleed port adapted to discharge into the sump 137; the port 308 is connected with the line pressure supply conduit 140; the port 309, which is a relatively restricted port, is connected with a throttle pressure supply conduit 311; and the port 310 is also connected with the conduit 311. The conduit 311 is connected with the port 269 of the valve 112 and the ports 205 of the valve 111. Throttle pressure is also supplied to the port 249 of the rear servo check valve 114 through the conduit 311 connecting the ports 205 of the valve 111 with the port 249 of the valve 114. A spring 312 is provided between the pistons 295 and 303 for providing a force on the piston 303 when the piston 295 is moved to the right as seen in the drawing, and a bleed port 313 is provided between the pistons 295 and 303 in proximity to the spring 312.

The throttle modulator valve 106 comprises a piston 314 having lands 315, 316 and 317. A sheet metal spring retainer 318 embraces the land 315; and a spring 319 is provided between the land 316 and the retainer 318. A spring 320 is provided between the land 317 and the adjacent end of the cavity in which the piston 314 is disposed. The valve 106 comprises ports 321, 322, 323, 324, 325 and 326. The port 321 is a bleed port discharging into the sump 137; the port 322 is connected to the throttle pressure supply conduit 311; the port 323 is a bleed port discharging into the sump 137; and the port 326 is connected by means of a branch conduit 327 with the conduit 213.

The compensator valve 105 comprises pistons 328, 329 and 330. The piston 328 constitutes a simple plug slidably disposed in a stationary sleeve 331. The piston 329 comprises lands 332, 333, 334 and 335. The piston 330 comprises lands 336 and 337. A spring 338 is disposed between the land 332 and the fixed sleeve 331, and a spring 339 is disposed between the land 332 and the movable plug 328.

The valve 105 is provided with ports 340, 341, 342, 343, 344, 345, 346, 347, 348 and 349. The ports 340 and 341 are connected by means of a conduit 350 with the port 157 of the regulator valve 107; the port 342 is connected by means of a conduit 351 with the port 325 of the modulator valve 106; the port 343 is connected by means of a conduit 352 with the port 324 of the modulator valve 106; the ports 344 and 349 are connected to the governor pressure conduit 291; the ports 345 and 346 are connected to the line pressure supply conduit 140; and the ports 347 and 348 are bleed ports adapted to discharge into the sump 137.

The valve 108 is a regulator valve for regulating the pressure within the hydraulic torque converter 29. The valve 108 comprises a valve piston 353 having lands 354, 355 and 356. A spring 357 is provided between the land 354 and a stationary part for yieldably holding the piston 353 downwardly. The valve 108 comprises ports 358, 359, 360, 361, 362 and 363. The port 358 is connected with the ports 158 and 154 which are in permanent connection around the valve piston 147 and also with the torque converter 29 through a torque converter inlet conduit 364; the port 359 is connected with the conduit 350; the port 360 is a bleed port adapted to discharge into the sump 137; the port 361 is connected by means of a torque converter outlet conduit 365 with the torque converter 29; the port 362 is connected with a conduit 366 which supplies lubricating oil to any suitable parts of the transmission; and the port 363 is connected by means of a conduit 367 with the pump inlet 135.

The various ranges of operation of the transmission are under the control of the manual valve 102, and this valve is controlled from the driver's compartment. A selector lever 368 located directly beneath the vehicle steering wheel 369 is connected by any suitable connecting mechanism with the manual valve piston 159 so that the piston 159 can be moved into any of its principal positions.

The transmission is maintained in its neutral condition by having the manual selector valve piston 159 in its "N" or neutral position. When the engine of the vehicle begins operating, the pump 100 driven by the engine supplies line pressure to the conduits 136 and 140 and connected conduits, pumping oil from the sump 137 through the pump inlet 135. The conduit 140 is connected with the conduit 136 through the check valve 144, the check valve 144 being held open by the fluid pressure from the pump 100. This fluid pressure in the conduit 140 holds the check valve 141 closed so that fluid cannot escape through the rear pump 101, which is assumed inoperative at this time with the vehicle being stationary. The land 161 of the manual valve piston 159 in the neutral position of the piston blocks the port 163 connected with the line pressure supply conduit 140 and thereby prevents application of fluid pressure to the engaging pistons for any of the power train completing clutches and brakes of the transmission.

The main oil pressure regulator valve 107 functions for all conditions of the transmission and its hydraulic control system to regulate the line pressure in the conduit 140 and connected conduits to predetermined maximum values. For this purpose, the line pressure from the conduit 140 is supplied through the port 156 between the lands 150 and 151, and since the land 150 is of larger diameter than the land 151, the line pressure applied to these lands tends to move the regulator valve piston 147 upwardly against the action of the spring 152. This movement of the piston 147 tends to release the line pressure from the conduit 140 between the lower edge of the land 148 and an edge of the ports 154 and 158 into the converter supply conduit 364. The spring 152 is of such strength that the ports 154 and 158 will not be thus opened by line pressure influence on the valve piston 147 until a certain value of line pressure is reached. This value of line pressure is maintained by the valve 107 in thus relieving pressure from the conduit 140, assuming that there are no other influences on the piston 147 than just mentioned.

For most conditions of operation, however, an additional variable force is applied to the piston 147 tending to move it, and this third force is due to fluid pressure of different values (which may be termed "compensator pressure") supplied to the lower end of the piston 147 through the port 157 and conduit 350. For the neutral condition of the transmission when the accelerator 302 is in its closed throttle, relaxed position; full line pressure is supplied to the lower end of the piston 147 through the port 157. Line pressure flows from the conduit 140 through the port 346 of the compensator valve 105, the groove between the lands 332 and 333, the port 340 and the conduit 350 to the port 359. Line pressure is supplied from the conduit 350 through the port 341 to the space between the lands 333 and 334, and since the land 333 is larger than the land 334, this line pressure tends to move the piston 329 to the left against the action of the springs 338 and 339; however, for this condition of operation the springs acting on the piston 329 are of sufficient strength to hold the piston to the limit of its movement to the right.

The fluid pressure applied to the main oil regulator valve piston 147 on its lower end provides a force acting against the spring 152 tending to move the piston 147 upwardly as seen in the figure to more fully open the ports 154 and 158 to the groove between the lands 149 and 150. The full line pressure applied to the lower end of the piston 147 thus maintains the line pressure in the conduit 140 and connected conduits at a predetermined minimum, which for one certain embodiment of the invention is 55 pounds per square inch.

The secondary main regulator valve 108 is for the purpose of regulating the fluid pressure within the conduit 364 and thereby within the torque converter 29 to which the conduit 364 supplies fluid pressure. The pressure in the ports 154 and 158 and in the conduit 364 and between the lands 148 and 149 of the main regulator valve piston 147 is applied between the lands 354 and 355 of the low oil pressure regulator valve piston 353 through the port 358, and since the land 354 is larger than the land 355, this fluid pressure tends to move the piston 353 upwardly against the action of the spring 357 to open up the port 362 and meter fluid between the land 354 and an edge of the port 362. Thus as the fluid pressure in the conduit 364 and in the converter 29 tends to increase, the excessive fluid pressure is discharged through the port 362, and the pressure in the conduit 364 and converter 29 is regulated to a predetermined maximum. The conduit 366 is connected to various working parts of the transmission for lubricating them, and when this conduit is filled, the valve piston 353 moves slightly further against the action of the spring 357 on a slight increase of pressure in the converter 29 so as to relieve fluid from the port 361 through the groove between the lands 355 and 356 to the bleed port 360. At this time the regulating effect of the valve 108 takes place between the land 355 and the lower edge of the port 361, and the fluid flows through the conduit 364 and through the torque converter 29 to the conduit 365 which is the fluid discharge conduit for the torque converter 100.

The compensator pressure in the conduit 350 is also applied to the valve piston 353 for changing the regulated converter pressure in the conduits 364 and 365 and in the torque converter 29 for various conditions of operation of the transmission and controls. The pressure on the lower end of the valve piston 353 tends to move the piston 353 upwardly against the action of the spring 357 to open the discharge port 361 for the torque converter to the bleed port 360 and to thus further relieve the pressure in the conduit 364 and 365 and converter 29. With full line pressure in the conduit 350 for conditions of operation just mentioned, the regulated converter pressure in the torque converter 29 is at a minimum, which, for one particular embodiment of the invention, is substantially 30 pounds per square inch.

Under certain relatively abnormal conditions, as for example when the oil in the sump 137 is cold, the conduit 367 relieves the fluid pressure in the converter 29 and in its supply conduit 364. The resultant increased pressure due to cold oil in the conduit 364 applied to the relatively large land 354 will move the piston 353 still farther upwardly against the action of the spring 357 so as to connect the ports 363 and 258 by means of the groove between the lands 354 and 355. In this case, the regulating action by the valve piston 353 is by virtue of a metering effect between the lower edge of the land 354 and the port 363, and the excessive fluid flowing through the port 363 flows directly through the conduit 367 to the inlet 135 of the pump 100.

The transmission and its control system are conditioned for operation in drive range by moving the manual selector valve piston 159 into its "D" or drive range position in which position the piston 159 provides a connection by means of the groove between the lands 160 and 161 of the ports 163, 167, 168 and 169. The port 163 is supplied with line pressure, and line pressure is thus supplied to these other ports. The line pressure supplied to the port 168 flows through the conduit 171 to the piston 57 for the clutch 30, and the clutch 30 is thus engaged. The line pressure from the conduit 171 flows also to the governor valve 115 through the branch conduit 290. The line pressure supplied to the port 169 flows through the conduit 214; however, assuming the vehicle is stationary, the valve 111 is in its illustrated position, and the valve land 195 blocks the port 202 connected with the conduit 214. The line pressure supplied to the port 167 flows through the conduit 170 to the cavity 121 of the servo motor 116 for the front brake 32, and this brake would be applied were it not for the fact that the same line pressure is supplied to the release cavity 122 as will be described.

The line pressure in the conduit 170 flows through the ports 187 and 186 and the groove between the lands 174 and 175 in the 1–2 shift valve 113 to the conduit 281. The valve piston 258 of the orifice control valve 112 is in its illustrated position initially when the manual valve piston 159 is moved into its "D" position. The line pressure from the conduit 281 flows through the ports 273 and 272, which are connected by the groove between the lands 260 and 261 of the orifice control valve 112, to the conduit 280. The line pressure in the conduit 280 divides between the port 203 in the 2–3 shift valve 111 and the conduit 255.

The line pressure supplied to the port 203 flows through the groove between the lands 195 and 196 in the 2–3 shift valve 111 and through the port 204 into the conduit 278, and from thence the fluid flows through the restriction 279 and permanently connected ports 271 and 267 into the conduit 276. The release cavity 122 is connected with the conduit 276, and this pressure supplied to the cavity 122 effectively in conjunction with the spring 123 overcomes the force on the piston 117 due to the fluid pressure in the supply cavity 121, maintaining the brake 32 disengaged. Fluid pressure from the conduit 276 flows through the connected conduit 244 and port 239 to the lower end of the transition valve 110 and moves the valve piston 232 upwardly to the limit of its movement against the action of the spring 237.

The portion of the fluid pressure in the conduit 280 that flows into the branch conduit 255 flows through the port 250 of the rear servo check valve 114 and, acting against the large size land 246, moves the valve piston 245 to the limit of its movement to the right against the action of the spring 248 to open the port 251. Fluid pressure from the port 250 flows between the lands 247 and 246 and through the port 251 into the conduit 256 to the port 240. The line pressure from the port 240 flows through the groove between the lands 235 and 236 of the transition valve piston 232 to the port 238 and into the conduit 243. The conduit 243 is connected with the servo motor 124 for the rear brake 33, and the rear brake 33 is thus applied so as to complete the low speed power train through the transmission. The line pressure in the conduit 243 also flows through the connected conduit 277 to the lower end of the orifice control valve and moves the valve piston 258 against the action of the spring 264 to the upper limit of its movement. The fluid pressure applying the servo motor 124 for the rear brake 33, as has just been described, flows through both the restriction 279, and application of the rear brake 33 is softened. The accumulator in the rear servo motor 124 which is effectively between the piston 125 and the lever 127 also has this function. As fluid pressure is applied to the piston 125, the bell crank 127 is moved and when the band 66 contacts its drum 67, the accumulator piston spring 131 is compressed to allow movement of the piston 125 without corresponding movement of the lever 127. As the accumulator piston 130 bottoms on the floor of the rear servo piston 125, the brake 66 is fully applied.

When the low speed power train is completed as just described, by engagement of the clutch 30 and brake 33, the accelerator 302 is assumed to be in its closed throttle position with the vehicle engine crankshaft rotating at idling speeds. Under these conditions, insufficient power is transmitted through the low speed power train and, in particular, through the hydraulic torque converter 29, for driving the driven shaft 26 and the vehicle, and the drive may be made effective for driving the vehicle by simply depressing the accelerator 302 to open the engine throttle.

Throttle opening movement of the accelerator 302 also has other effects on the hydraulic control system, including an increasing of the line pressure in conduit 140 and connected conduits, for increasing the applying pressure for the rear brake 33 and the front clutch 30, and also an increasing of the fluid pressure within the hydraulic torque converter 29.

The accelerator 302 acts on the throttle valve piston 303 through the intermediary of the downshift valve piston 295 to provide a throttle pressure in conduit 311 which is less than the line pressure in conduit 140, which throttle pressure increases from zero at closed throttle position of the accelerator to line pressure at open throttle accelerator position. The throttle valve 104, like the valves 107 and 108, is a regulator valve providing a variable fluid pressure by metering fluid flow between a valve land and a valve port in accordance with variable forces impressed on the valve. The accelerator 302 tends to move the throttle valve piston 303 to the right as seen in the figure upon depression of the accelerator by means of the downshift valve piston 295 and the spring 312. Such movement of the throttle valve piston 302 provides a connection between the ports 308 and 310 through the groove between the lands 304 and 305 admitting fluid under pressure into the conduit 311 through the port 310. The pressure in the conduit 311 flows back through the port 309 and is thus effective on the lands 305 and 306. Since the land 305 is of larger diameter than the land 306, the fluid pressure on these lands tends to move the valve piston 303 back to the left against the action of the spring 312, so that the land 305 tends to again close the port 308 and block further admittance of fluid pressure to the conduit 311. The greater the depression of the accelerator, the greater will be the force from the spring 312 on the throttle valve piston 303, and the greater must be the pressure in the conduit 311 for closing the port 308 by the land 305, and hence the valve 104 has a regulating action to provide a throttle pressure in the conduit 311 which increases with accelerator depression.

The throttle pressure from the throttle valve 104 is supplied through the conduit 311 to the throttle modulator valve 106. The valve 106 functions to provide a limited or so-called modulator pressure in the conduit 351. This limited pressure in conduit 351 is the same as the throttle pressure in conduit 311 up to a predetermined maximum value, and for further increases in throttle pressure corresponding to increased openings of the engine throttle, the modulator pressure in conduit 351 remains at this predetermined maximum value. The throttle pressure in conduit 311 flows through the port 322 of the throttle modulator valve and through the groove between the lands 316 and 317 to the port 325 and the conduit 351. The spring 320 is a relatively light spring as compared to the spring 319, and this spring 320 functions to normally maintain the valve piston 314 in its illustrated position with the spring retainer 318 contacting the adjacent end of the bore for the piston 314 and with the part of the retainer 318 overlying the land 315 being held in contact with the right end face of the land 315 by the spring 319, and the spring 320 is then substantially at its free length. The spring 320 assures that the ports 322 and 325 remain in communication by means of the groove between the lands 316 and 317 until the modulator pressure in the conduit 351 reaches its predetermined value.

The modulator pressure in the conduit 351 is applied to the lands 316 and 317, and since the land 316 is larger than the land 317, this fluid pressure tends to move the piston 314 to the left against the action of the spring 319, the spring retainer being bottomed under these conditions on the adjacent end of the cavity in which the piston 314 is disposed. When the fluid pressure in the conduit 351 reaches its predetermined maximum value the pressure moves the piston 314 to the left and closes the port 322 by means of the land 317, so that the pressure of the fluid in the conduit 351 increases no further. In the particular embodiment of the invention mentioned before, the modulator pressure in the conduit 351 had a maximum of 50 pounds per square inch at about 25% throttle opening, and the modulator pressure remained constant for additional throttle opening movements of the accelerator.

The modulator pressure in conduit 351 is applied to the compensator valve 105, which is a regulator valve, for providing a compensator pressure in the conduit 350 that decreases with depression of the accelerator pedal for initial throttle opening movements of the accelerator. The compensator pressure in conduit 350 also increases with the speed of the driven shaft 26 and the vehicle. In this connection, the action of the governor valve 115 in producing a governor pressure in conduit 291, which is connected to the compensator valve, will now be described.

The governor valve 115 like the valves 107, 105, 108 and 104, is a regulator valve; that is, it produces an output pressure that varies gradually with changing forces on the valve. The casing 282 for the valve 115 rotates with the driven shaft 26 of the transmission, and the valve piston 283 and weight 292 tend to move outwardly under the influence of centrifugal force. The weight 292 in particular has a relatively large centrifugal force acting on it, and this force is transmitted to the hollow valve piston 283 by means of the spring 294 disposed between the piston 283 and the spring retainer 293. Line pressure is present in the conduit 290, and, on outward movement of the valve 283, fluid flows through the port 287, the groove between the lands 284 and 285, and the port 288 into the conduit 291 to supply pressure to the latter conduit. The pressure in the conduit 291 is applied to the facing ends of the lands 284 and 285, and since the land 285 is larger in diameter than the land 284, this fluid pressure tends to move the piston 283 inwardly of the valve casing 282, so that the land 284 will move over the port 287 and block any further admission of fluid pressure to the conduit 291. A balance is attained between the centrifugal force effective on the valve piston 283 tending to move the piston outwardly of the casing 282, which increases with vehicle speed, and the force derived from the fluid pressure in the conduit 291 effective on the lands 284 and 285 tending to move the piston 283 inwardly, which increases with the pressure in conduit 291, for every speed of the driven shaft 26. The valve piston 283 thus meters the flow of fluid under pressure to the governor output conduit 291 between the land 284 and the inner edge of the port 287 and provides a regulated governor pressure in the conduit 291 that increases with the speed of the driven shaft 26 and of the vehicle. The effect of the spring 294 effectively between the weight 292 and the valve piston 283 is to allow the weight 292 to move outwardly of the casing 282 and radially with respect to the shaft 26 without corresponding movement of the piston 283 at the higher speeds of the shaft 26. This arrangement provides a governor pressure that increases more gradually with increases in speed of the driven shaft 26 than would be obtained if the piston 283 had a solid connection with the weight 292.

The governor pressure in conduit 291 that increases with the speed of the driven shaft 26 and of the vehicle is impressed through the ports 344 and 349 on the compensator valve 105 and particularly on its pistons 328 and 330. The governor pressure applied on the piston 330 through the port 344 is not immediately effective on the piston 329, which is the regulating piston of the compensator valve 105, when the vehicle is being started, since line pressure is supplied between the lands 336 and 337 from the conduit 140 and port 345. The governor pressure starts from zero when the vehicle is at a standstill and increases, while the line pressure is at some much higher value, such as 75 pounds per square inch under the same conditions. Since the land 337 is larger than the land 336, the piston 330 is held to the limit of its movement to the right out of contact with the regulating piston 329 until the governor pressure increases sufficiently to overcome the effect of line pressure on the lands 336 and 337. The governor pressure in conduit 291 is initially, at low speeds of the vehicle, effective through the valve piston 328 on the regulating piston 329. The governor pressure is applied through the port 349 on the piston 328, and force on the piston 328 is transmitted through the spring 339 to the piston 329 tending to move the latter to the right, the force so impressed on the piston 329 increasing with governor pressure and vehicle speed.

The modulator pressure in the conduit 351 that increases with accelerator opening to a predetermined maximum is impressed on the lands 334 and 335; and, since the land 334 is larger than the land 335, this modulator fluid pressure tends to move the compensator piston 329 to the left. This is just opposite to the effect of the increasing governor pressure in the conduit 291.

Line pressure is supplied to the port 346 from the conduit 140, and the piston 329 functions to regulate so as to provide compensator pressure in the conduit 350. This compensator pressure increases with increasing governor pressure in the conduit 291 and decreases with increasing throttle pressure in the conduit 311 and modulator pressure in the conduit 351. The springs 338 and 339 tend to hold the piston 329 to the limit of its movement to the right opening the port 346 by means of the groove between the lands 332 and 333 to the port 340 and the compensator conduit 350. Fluid thus flows into the compensator conduit 350. The compensator pressure in the conduit 350 flows through the port 341 between the lands 333 and 334 and tends to move the piston 329 back again so as to close the port 346 by means of the land 333, this return movement of the piston 329 being by virtue of the fact that the land 334 is larger than the land 335. Thus, the land 333 meters fluid flow between it and an edge of the port 346, providing a certain regulated compensator pressure in the conduit 350. The governor pressure tends to move the piston 329 to the right as above described, so as to move the land 333 off the port 346 and admit further fluid pressure to the compensator conduit 350. Thus, the compensator pressure in the conduit 350 increases with governor pressure and vehicle speed. The modulator pressure, as above described, tends to move the piston 329 to the left to close the line pressure supply port 346 by means of the land 333, and thus the compensator pressure in the conduit 350 decreases with increasing throttle pressure and modulator pressure.

The piston 330, at higher speeds of the vehicle, reduces the effect of the governor pressure just described in increasing the compensator pressure in the conduit 350. As the governor pressure in the conduit 291 rises, eventually it is sufficient so as to move the piston 330 to the left, so that this piston acts on the piston 329 and tends to move the latter piston to the left against the action of the governor transmitted through the piston 328. The piston 330 is moved to the left by the governor pressure when the governor pressure overcomes the effect of the line pressure impressed through the port 345 on the lands 336 and 337 tending to move the piston 330 to the right. The line pressure in the conduit 140 and applied to the land faces 336 and 337 decreases with increasing governor speeds, as will hereinafter be described, and there thus exists a crossing of the effect of line pressure which decreases with increasing vehicle speed and governor pressure which increases with vehicle speed, both effective on the piston 330, after which the piston 330 is effective on the valve piston 329 and its regulating action.

When the vehicle begins to move, after the accelerator 302 has been moved toward its open throttle position to increase the speed and power output of the vehicle engine, the rear pump 101 begins its pumping action and draws fluid through the intake conduit 138 from the sump 137 and discharges it into the outlet conduit 139. The check valve 141 remains closed until the pressure of the fluid discharged by the rear pump 101 increases to a sufficient value to overcome the forces due to the line pressure and the spring 143 on the piston 142; and at this time, the check valve 141 opens and the rear pump discharges into the line pressure conduit 140. The fluid flow through the line pressure conduit 140 then reverses the closes the check valve 144 by moving the piston 145 upwardly onto its seat. The closing of the check valve 144 blocks discharge by the front pump 100 into the line pressure conduit 140 and its connected conduits, and the rear pump now becomes the sole supply of line pressure for conduit 140 and connected conduits. The line pressure in the conduit 140 is impressed on the main oil pressure regulator valve piston 147 and particularly its lands 150 and 151 through the port 156 to provide the regulating action between the land 148 and the port 153 when the front pump 100 alone is providing the line pressure, and when the line pressure increases slightly due to closing of the check valve 144 and opening of the check valve 141 as just described, the piston 147 is moved upwardly slightly, since the line pressure is effective to move the piston 147 in this direction due to the land 150 being larger than the land 151; and under these conditions, the port 153 is fully opened so as to connect the ports 153 and 158. With the rear pump 101 being active, the regulating effect of the valve 107 is between the lower edge of the land 149 and the lower edges of the ports 154 and 158, with the excess pressure produced by the rear pump 101 escaping from the port 155, the groove between the lands 149 and 150 to the ports 154 and 158. With the rear pump 101 being thus active to produce the line pressure, the line pressure is now regulated exactly as has been previously described, except that it is slightly higher in value and is metered between the land 149 and ports 154 and 158 instead of between an edge of the port 153 and the land 148. The front pump now functions solely to supply fluid under pressure to the converter 29.

The compensator pressure in conduit 350 as it changes with accelerator opening and vehicle speed causes a change in the line pressure regulating action of the main oil pressure regulator valve 107 as compared with its operation when the accelerator is in its closed throttle position and the vehicle is stationary. The pressure in the conduit 350 is impressed on the lower end of the main oil pressure regulator valve piston 147 through the port 157 and tends to move the piston 147 upwardly against its spring 152 to more fully open the port 153 or the ports 154 and 158 depending on which of these ports is regulating, with the driven shaft pump 101 being inactive in one case and active in the other case. The piston 147 thus vents the line pressure conduit 140 less and maintains the line pressure in the conduit 140 at a higher value as the compensator pressure in conduit 350 decreases and acts conversely to maintain line pressure at a lower value as the compensator pressure increases.

As has been explained, the compensator pressure in the conduit 350 increases with increasing governor pressure in the conduit 291 and increasing vehicle speed and decreases with increasing throttle pressure and throttle opening. Therefore, the line pressure, which is initially supplied to the servo motor 124 for the rear brake 33 and also to the piston 57 for the front clutch 30 for engaging these friction devices when the selector valve piston 295 is put in its drive range position, increases with accelerator opening and decreases with increasing vehicle speed. The line pressure is made to increase with increased accelerator opening so that the front clutch 30 and rear brake 33 have the capacity to take the additional torque from the vehicle engine which results from depression of the accelerator 302 and opening of the engine throttle. As has been hereinbefore explained, the hydraulic torque converter 29 is of the usual type providing a decreased torque multiplication as the speed increases; and, therefore, line pressure can be and is decreased with increasing governor pressure and vehicle speed since the engaging devices in the gearing behind the torque converter 29 need take a decreasing torque with the decreasing torque multiplication of the torque converter 29. The line pressure is also supplied to the servo motor 116 for the brake 32 and to the piston 63 for the clutch 31 for engaging these friction devices when the transmission is in intermediate or high speed drives; and the line pressure is made to vary as above described, in accordance with throttle opening and vehicle speed, so that the engaging pressures of the friction brakes and clutches are just a little higher than is required to carry the torque by each of these clutches and brakes. It has been found that if these clutches and brakes are engaged for changing drives through the transmission with engaging pressures which are just a little higher than sufficient for carrying the torque, the engagement of these friction engaging devices and the consequent completions of the power trains are relatively smooth.

The compensator pressure in the conduit 350 functions on the low oil pressure regulator valve 108 to cause an increase in the pressure within the torque converter 29 as the accelerator is depressed and to cause a decrease in the pressure within the torque converter 29 as the vehicle speed increases. The compensator pressure is applied to the lower end of the regulator valve 108 and tends to move the piston 353 upwardly against the action of the spring 357 so as to increase the metering effect between the land 355 and the lower edge of the port 361, thereby relieving a greater amount of fluid from the torque converter 29 flowing through the outlet conduit 365 of the torque converter 29. Thus, as the compensator pressure in the conduit 350 increases, the bleeding effect of the valve 108 is increased to decrease the fluid pressure in the converter 29 and as the compensator pressure decreases, this bleeding effect decreases to cause an increase in the pressure in the torque converter 29. Thus, the pressure in the torque converter 29 is increased as the vehicle accelerator is moved toward open throttle position, and the pressure in the torque converter 29 is decreased as the vehicle speed increases. This regulating action of the fluid pressure in the torque converter 29 is provided since a greater fluid pressure is required in the torque converter with increasing torque output of the vehicle engine, and a decreasing pressure in the torque converter 29 is sufficient with decreased torque multiplication by the torque converter with increasing speeds.

The 1–2 shift valve 113 is under the influence of the governor pressure within the conduit 291 that increases with the speed of the driven shaft 26, and when the shaft speed increases to a predetermined value, the 1–2 shift valve 113 shifts to change the drive in the transmission from its low speed ratio to its intermediate speed ratio. The 1–2 shift valve piston 172 is shifted to provide this change of drive against the action of the spring 190 and a so-called "shift valve plug pressure" that varies with the throttle pressure in the conduit 311.

The plug 193 of the 2–3 shift valve 111 provides the "shift valve plug pressure" that is effective on the 1–2 shift valve 113 opposing the action of the governor pressure. The throttle pressure in the conduit 311 is supplied to the lower end of the plug 193 tending to move the plug against the action of the spring 199 so as to connect the ports 205 and 206 and supply pressure to the conduit 215 connected with the port 206. The pressure in the conduit 215 is supplied to the port 208 to the top side of the plug 193, and this pressure in the port 208 augments the action of the spring 199 in returning the plug 192 to a position blocking the port 206. The plug 193 thus functions as a regulating valve, opening the port 206 on an increase of throttle pressure and closing the port 206 when the pressure within the conduit 215 applied to the top end of the plug 193 becomes sufficient to augment the force due to the spring 199 sufficiently so as to move the plug 193 downwardly. The plug 193 thus provides a "shift valve plug pressure" in the conduit 215 that increases with throttle pressure but is less than throttle pressure by a predetermined value due to the force provided by the spring 199 on the plug 193.

The "shift valve plug pressure" provided in the conduit 215 flows through the port 182 of the 1–2 shift valve 113, the groove between the lands 176 and 177, the port 183, the conduit 229, the port 224 of the inhibitor valve 109, the groove between the lands 219 and 220, the port 225, the conduit 230 and the port 185 to the lower end of the shift valve piston 172, so that this shift valve plug pressure augments the action of the spring 190.

When the governor pressure in the conduit 291 which is applied to the top end of the shift valve 172 through the port 178 becomes sufficiently great so that it overcomes the forces due to the shift valve plug pressure and the spring 190 on the lower end of the shift valve 172, the piston 172 moves downwardly from its low speed position in which it is illustrated into its intermediate speed position. In this position, the valve piston 172 blocks the port 187 and conduit 170 containing line pressure and opens the conduit 281 and its port 186 to the sump 137 through the bleed port 180, the ports 186 and 180 being connected by means of the groove between the lands 174 and 175.

All of the valving and servo motors supplied with fluid under pressure from the conduit 281 are thus drained to the sump 137. As has been previously described, when the 1–2 shift valve piston 172 is in its low speed position, it provides line pressure to the conduit 281, the ports 273 and 272 of the orifice control valve 112, the conduits 280 and 255, the port 203 from the conduit 280, the port 204, the conduit 278, the ports 270 and 271, the conduit 276, the band release cavity 122 in the servo motor 116 for the front brake 32 and the conduit 244; and the fluid pressure from the conduit 255 flows through the ports 250 and 251 of the rear servo check valve 114, the conduit 256, the ports 240 and 238, and the conduit 243 to the rear brake servo motor 124, and the pressure on the rear brake servo motor 124 also is impressed through the conduit 277 and the port 268 on the lower end of the orifice control valve piston 259. All of these parts are drained by movement of the 1–2 shift valve 172 from its low speed position downwardly into its intermediate position, and the brake 33 is thus disengaged and the brake 32 is engaged for causing the change of speed ratio. The spring 126 in the servo motor 124 functions to move the piston 125 back again into its brake disengaging position, and the pressure in the apply cavity 121 of the servo motor 116 functions to engage the front brake 32.

The governor pressure in the conduit 291 is effective through the ports 212 and 209 on the plug 191 and on the land 197 of the 2–3 shift valve 111 tending to move the valve piston 192 downwardly against the action of the springs 198 and 199 from its intermediate speed position to its high speed position. Such movement of the piston 191 is also against the action of the shift valve plug pressure provided by the plug 193 within the port 208 and effective on the land 197. When the speed of the vehicle becomes sufficiently great to produce a sufficiently high governor pressure, the plug 191 and the piston 192 move into their high speed drive positions with the piston 192 being in contact with the plug 193 which is bottomed in its cavity at its lowermost position. In this position of the piston 192, the ports 202 and 211 are connected together by means of the groove between the lands 194 and 195, and the ports 210 and 204 are connected together by means of the groove between the lands 195 and 196. The port 202 carries line pressure from the selector valve 102, and this line pressure flows to the port 211 and from thence through the conduit 216 to the piston 63 for the rear clutch 31, engaging the clutch and thereby completing the high speed forward drive. The line pressure in the port 211 also flows through the port 210, the port 204, the conduit 278, the port 270, the port 267, the conduit 276 to the disapply cavity 122 in the servo motor 116 for the brake 32, thus causing disengagement of the brake 32, even though line pressure remains applied in the opposing cavity 121. It is assumed that this change is made when the accelerator is at some open throttle position so that the ports 270 and 267 of the orifice control valve 112 are completely open with respect to each other.

A downshift from high to intermediate speed ratio may be obtained by moving the accelerator to a fully opened throttle or kickdown position. The downshift valve piston 295, when the accelerator is so positioned, is moved toward the right so as to connect the ports 298 and 299 by means of the groove between the lands 296 and 297. The port 298 is supplied with line pressure, and line pressure is thus supplied through the port 299, the conduit 301 and the port 207 into the cavity for the piston 192 and on the land 197 of the piston 192. The piston 192 and plug 191 are moved by the action of the line pressure upwardly to the limit of their movement into their intermediate drive positions, assuming that the vehicle is not travelling at some unduly high speed, such as 65 miles per hour, at which the governor pressure is so high that the line pressure impressed on the land 197 cannot move the pistons 192 and 191 upwardly against the effect of governor pressure on the end of the plug 191 and on the upper side of the land 197.

The valve piston 192 in its intermediate speed drive or uppermost position connects the ports 211 and 201 by means of the groove between the lands 194 and 195 and drains the clutch piston 63 through the conduit 216, the ports 211 and 201, the conduit 213, the port 166, the groove between the lands 161 and 162 of the selector valve 102 and the bleed port 165 of the valve 102. The clutch 31 is thus disengaged.

The 2–3 shift valve piston 192 also connects together the ports 203 and 204 in the intermediate speed drive position of the piston 192, and the release cavity 122 of the servo motor 116 for the brake 32 is drained to the sump through the conduit 276, the ports 267 and 270 which are connected together by means of the groove between the lands 262 and 263 of the orifice control valve 112 when the accelerator is in its open throttle position, the conduit 278, the ports 204 and 203, the conduit 280, the ports 272 and 273, also connected together by the orifice control valve piston 258 when the accelerator is in its open throttle position, the conduit 281 and the ports 186 and 180 of the 1–2 shift valve 113 which are connected together in the intermediate speed drive position of the 1–2 shift valve 113 in which this valve is disposed at the time. The release cavity 122, being thus drained, allows engagement of the brake 32 under the action of the line pressure remaining in the cavity 121 of the servo motor 116. The clutch 31 is thus disengaged and the brake 32 is engaged to again complete the intermediate speed drive.

A downshift from high speed drive to intermediate speed drive may also be obtained under the action of the governor valve 115 as the vehicle speed decreases, as for example, when the accelerator is in a closed throttle position. Under these conditions, the orifice control valve 112 functions to retard the draining of fluid from the brake release cavity 122 of the servo motor 116 for the front brake 32 so as to cushion the engagement of this brake and prevent an unduly harsh completion of the intermediate speed drive. As the vehicle speed and governor pressure in the conduit 291 decrease, the springs 198 and 199 eventually overcome the governor pressure applied to the piston land 197 through the port 209 and on the plug 191 through the port 212 and move the piston 192 upwardly into its intermediate speed position, at the upward limit of its movement. The conduit 216 connected with the clutch 31 is drained as just described to disengage the clutch 31 through the ports 211 and 201, the conduit 213 and the ports 166 and 165. Since the accelerator is released, the throttle pressure in the conduit 311 is at substantially zero value, and the spring 264 of the orifice control valve 112 is effective to hold the valve piston 258 at the lower limit of its movement so as to block the port 267 with respect to the port 270. Pressure drains from the release cavity 122 of the servo motor 116 through the conduit 276, the permanently connected ports 267 and 271, the restriction 279, the conduit 278, the ports 204 and 203, the conduit 280, the ports 272 and 273 connected by the groove between the lands 260 and 261 of the orifice control valve 112, the conduit 281 and the ports 186 and 180 connected together by means of the groove between the lands 174 and 175 of the 1–2 shift valve piston 172 to cause engagement of the brake 32. Since the fluid from the release cavity 122 of the servo motor 116 drains through the restriction 279, application of the brake 32 is delayed, thereby smoothing the shift from third speed ratio to second speed ratio with the accelerator in closed throttle position.

A downshift from intermediate to low speed drive may be obtained while the vehicle is travelling in intermediate speed by moving the accelerator 302 to its kickdown position, and such changes in drive will occur, assuming that the speed of the vehicle is not unduly high. As previously described, when the accelerator 302 is in its kickdown position, the downshift valve piston 295 connects the ports 298 and 299 thus supplying line pressure to the conduits 301 and 228. The line pressure flows from the conduit 228 through the ports 222 and 226 which are connected together by means of the groove between the lands 218 and 219 of the inhibitor valve piston 217, the conduit 231 to the port 181 of the 1–2 shift valve 113, and the line pressure is effective on the large diameter land 175 tending to move the valve piston 172 upwardly into its low speed position against the governor pressure effective on the upper end of the piston 172. Assuming that the vehicle speed and the governor pressure are not unduly high, the piston 172 will move upwardly into its low speed position.

The line pressure in the conduit 301 is supplied also to the conduit 215 through the ports 207 and 208 connected together by the cavity for the valve 111 when the pistons 192 and 193 are in their illustrated positions as is the case under the present circumstances. The line pressure in the conduit 215 flows through the ports 182 and 183 connected together by means of the grove between the lands 176 and 177 when the 1–2 shift valve 113 has moved to low speed position, the conduit 229, the ports 224 and 225 connected together by means of the grove between the lands 219 and 220 of the inhibitor valve 109, the conduit 230 and the port 185 to the lower end of the piston 172 of the 1–2 shift valve 113, thus maintaining the piston 172 in its low speed position once the piston has moved from its intermediate speed position to its low speed position.

Line pressure is supplied to the port 187 of the 1–2 shift valve from the conduit 170 connected to the manual valve 102, and this line pressure flows through the groove between the lands 174 and 175 of the 1–2 shift valve 113 in its low speed position, the port 186, the conduit 281, the ports 273 and 272 connected together by means of the groove between the lands 261 and 262 of the orifice control valve 112 which is held in its upper position by the throttle pressure in conduit 311, the conduit 280, the ports 203 and 204 of the 2–3 shift valve connected together by means of the groove between the lands 195 and 196, the conduit 278, the ports 270 and 267 connected together by means of the groove between the lands 262 and 263 of the orifice control valve 112 and the conduit 276 to the band release cavity 122 of the servo motor 116 for the front brake 32. The brake 32 is thus disengaged. Line pressure from the conduit 280 also flows through the branch conduit 255, the ports 250 and 251 connected together by means of the groove between the lands 247 and 246 of the rear servo check valve 114, the conduit 256 to the port 240 of the transition valve 110. As the pressure builds up in the release cavity 122 of the brake servo motor 116, this pressure is also applied to the lower end of the transition valve piston 232 through the conduit 244 and port 239; and as the fluid pressure reaches a predetermined value, the piston 232 is moved upwardly against the action of its spring 237 so as to connect together the ports 240 and 238 by means of the groove between the lands 235 and 236 of the transition valve piston 232 so as to apply fluid pressure on the brake servo motor 124 for the rear brake 33 through the conduit 243 and thereby apply the rear brake 33. The transmission is now in low speed ratio, and the application of the rear brake 33 has been controlled by means of the transition valve in accordance with the release of the front brake 32.

A downshift from second speed ratio to low speed ratio may also take place when the accelerator is in its released, closed throttle position, this downshifting action being due to the decreasing pressure from the hydraulic governor valve 115 as the driven shaft 26 decreases in speed. The spring 190 in the 1–2 shift valve 113 under these conditions moves the 1–2 shift valve piston 172 upwardly from its intermediate speed position to its low speed position against the decreasing governor pressure applied on the upper end of the shift valve piston 172. On such a movement of the piston 172, line pressure from the conduit 170 supplied by the manual valve 102 flows through the groove between the lands 174 and 175 of the 1–2 shift valve into the port 186 and the conduit 281. The orifice control valve piston 258 is now in its lowermost position under the action of the spring 264 since the throttle pressure in the conduit 311 impressed on the land 263 of the orifice control valve piston 258 is at zero and since there is no pressure at the beginning of this downshift applied on the rear brake servo motor 124 connected with the port 268 of the orifice control valve 112 through the conduit 277. The line pressure in conduit 281 flows through the port 273, the groove between the lands 260 and 261 of the orifice control valve piston 258 and the port 272 to the conduit 280.

The line pressure in the conduit 280, as in the case of a downshift by means of the accelerator 302 being moved to an open throttle kickdown position, flows both into the conduit 255 and also to the port 203 of the 2–3 shift valve 111. The line pressure supplied to the port 203 flows through the groove between the lands 195 and 196 of the 2–3 piston 192, the conduit 278, the restriction 279, the permanently connected ports 271 and 267, and the conduit 276 to the release cavity of the servo motor 116 for the front brake 32. As the pressure builds up in the cavity 122 initiating release of the brake 32, this increasing pressure applied through the conduit 244 and port 239 on the lower end of the transition valve 110 moves the transition valve piston 232 upwardly. Fluid pressure then flows through the conduit 255 from the conduit 280, the port 250, the groove between the lands 247 and 246 of the rear servo check valve 114, the port 254, the restriction 257, the permanently connected ports 253 and 251, the conduit 256, the port 240, the groove between the lands 235 and 236, the port 238 and the conduit 243 to the servo motor 124 for the rear brake 33. The rear servo check valve 114 has throttle pressure from the conduit 311 impressed on its left end, and since under closed throttle conditions, the throttle pressure is zero, the spring 248 holds the piston 245 to the limit of its movement to the left; and, therefore, the fluid flow into the conduit 256 and eventually into the servo motor 124 for the rear brake 33 is limited in its flow by means of the restriction 257.

The orifice control valve 112 by means of its restriction 275 acts to further slow application of the rear brake 33 and disapplication of the front brake 32 on a change from intermediate to low speed ratio with the accelerator in closed throttle position. The pistons 258 and 259 of the orifice control valve 112 are in their lowermost position initially as this ratio change takes place. The pressure on the rear brake servo motor is applied on the lower end of the orifice control valve 112 through the conduits 243 and 277, and as the pressure in the rear brake servo motor 124 builds up, it eventually reaches a predetermined value at which movement of the pistons 259 and 258 upwardly takes place. During such movement, the land 261 at first covers the port 272, and, as it travels upwardly, blocks the ports 272 and 273 with respect to each other, and finally it blocks the port 273. During this movement, the fluid pressure which flows through the conduits 281 and 280 for application to the release cavity 122 of the front brake servo motor 116 and also to the rear brake servo motor 124 flows through the restriction 275, and the disengaging action of the front brake 32 and the engaging action of the rear brake 33 are thus further slowed. Thus, during a downshift from intermediate speed ratio to low speed ratio, the restriction 279 functions to retard disengaging fluid pressure to the front band servo motor 116; the restriction 257 retards the application of fluid pressure to the rear brake servo motor 124 once its application is started by movement of the transition valve 110; and the restriction 275 functions to retard both the disengagement of the front band 32 and the engagement of the rear band 33 once the fluid pressure applied to the rear band servo motor 124 reaches a predetermined value sufficient to move the orifice control valve 112. The smoothing of this downshift is particularly desirable since under closed throttle conditions, the vehicle tends to drive the engine from the driven shaft 26 through the transmission to the drive shaft 25, and the reaction on the brake 33 for this direction of drive is in the direction indicated by the arrow C, tending to wrap the band 66 on its drum 67. The completion of the low speed power train will thus be too harsh unless measures are taken to engage the brake 33, in particular, gradually for completion of this downshift.

The transmission is operated in low range by moving the manual selector valve piston 159 into its "L" position. In this position, the piston 159 connects the line pressure supply conduit 140 with the ports 164, 167 and 168 by means of the groove between the lands 160 and 161. As will be observed, this additional movement of the piston 159 drains the conduit 214; and, in lieu thereof, line pressure is supplied to the conduit 189 through the port 164. Draining of fluid pressure from the conduit 214 removes the pressure applied to the 2–3 shift valve 111 which is used by the valve 111 for completing the high speed drive, and fluid pressure supplied to the conduit 189 provides pressure for maintaining the transmission in low speed drive and preventing any upshifting action into intermediate speed drive as will be described.

The line pressure supplied to the port 164 of the manual valve 102 flows into the conduit 189 to the inhibitor valve 109, being supplied to the latter through the port 223. Line pressure is thus applied on the lower end of the inhibitor valve 109 and moves the inhibitor valve piston 217 upwardly against the action of its spring 221 to the limit of its movement. The conduit 189 is also connected with the port 179 of the 1–2 shift valve 113 and acts on the bottom face of the land 173, tending to hold the 1–2 shift valve piston 172 upwardly in its low speed position.

The conduit 189 is also connected with the port 300 of the downshift valve 103 and supplies line pressure to the port 299 and the conduits 301 and 228 through the groove between the lands 296 and 297 of the downshift valve piston 295. The line pressure in these conduits is supplied through the port 207 to the lower face of the land 197 of the 2–3 shift valve 111, and this line pressure functions to help maintain the 2–3 shift valve piston 192 in its second speed position in which it is shown. The line pressure passes also from the port 207 through the port 208, the conduit 215, the port 182, the groove between the lands 176 and 177, the port 183, the conduit 229 to the port 224 of the inhibitor valve piston 217 where it is blocked by the inhibitor valve piston 217 which is now in its uppermost position as has been explained.

The conduit 228 is also connected to the port 222 and thus supplies line pressure to the port, and pressure therefrom flows through the groove between the lands 219 and 220 of the inhibitor valve piston 217, the port 225, the conduit 230 and the port 185 to the lower end of the 1–2 shift valve; and this line pressure also tends to move the 1–2 shift valve piston 172 upwardly.

The conduit 170 contains line pressure from the selector valve 102, similarly as in high range operation, and the line pressure is thus supplied to the brake engaging cavity 121 of the servo motor 116 for the front brake 32 and also to the port 187 of the 1–2 shift valve 113. The 1–2 shift valve piston 172 in its low speed position connects the ports 187 and 186, as previously described. Line pressure is supplied from the port 186 and the conduit 281 to the servo motor 124 for the rear brake 33 and also to the release cavity 122 of the servo motor 116 for the front brake 32, to disengage the brake 32 and engage the brake 33, similarly as has been described above in connection with downshifts into low speed drive in high speed range when the 1–2 shift valve is moved into its low speed position. The front clutch 30 is engaged by fluid pressure from the conduit 171, similarly as in high range operation. The low speed drive is thus completed, and due to the line pressure supplied below the lands 173 and 177 of the 1–2 shift valve piston 172, the 1–2 shift valve piston 172 remains in its low speed position, and the governor valve 115 cannot cause upshifting of the transmission out of low speed drive when in low range.

The action of the inhibitor valve 109 in changing the shift point of the 1–2 valve 113 should be noted, for a change from high range to low range and a consequent change to low speed drive from intermediate speed drive as compared to the same speed ratio change in high range on a kickdown of the accelerator 302. The inhibitor valve 109 supplies line pressure from the conduit 228 and the port 222 to the lower end of the 1–2 shift valve through the groove between the inhibitor valve lands 219 and 220, the port 225, the conduit 230, and the port 185 when the selector valve 102 is moved into its low range position, as contrasted to the operation of the inhibitor valve on a kickdown from intermediate to low speed drive in drive range at which time the inhibitor valve 109 supplies line pressure from the conduit 228 through the port 222, the groove between the lands 218 and 219, the port 226, the conduit 231 and the port 181 between the lands 176 and 175. The differential between the lands 175 and 176 in diameter is not very large, and hence the force due to the application of line pressure on the lower side of the land 177 tends to move the valve piston 172 of the 1–2 shift valve 113 upwardly with a greater force than when the line pressure instead is applied on to the land 175 through the port 181. The inhibitor valve 109 functions in this manner since it is at the lowermost limit of its movement in high range and is at the uppermost limit of its movement in low range. Thus assuming a decreasing vehicle speed, the 1–2 shift valve 113 will shift from its intermediate to its low speed position at a higher governor pressure in the conduit 291 and at a higher vehicle speed than in the case in high range when the accelerator is moved to an open throttle kickdown position. In low range, once the 1–2 shift valve piston 172 moves into its low speed position, then the line pressure present in the conduit 189 which has been blocked by the land 173 in the intermediate speed position of the 1–2 shift valve piston 172, is released by movement of the land 173 off the port 179 to apply the line pressure on the lower side of the land 173, and the 1–2 shift valve piston 172 is thus held in its low speed position, and the transmission cannot shift out of low speed when in low range.

For reverse drive, the manual selector valve piston 159 is moved to connect the ports 167, 163, 164 and 166 together by means of the groove between the lands 160 and 161. The ports 169 and 168 and the conduits 214 and 171 connected thereto are drained to the sump 137. The conduit 140 supplies line pressure to the port 163, and line pressure is thus supplied to the conduits 170, 189 and 213. The conduit 170, as in drives previously described, supplies line pressure to the apply cavity 121 of the servo motor 116 for the front brake 32 and also supplies line pressure to the port 187 of the 1–2 shift valve 113. The conduit 189 supplies line pressure as in low range forward drive beneath the inhibitor valve 109 through the port 223 and beneath the land 173 of the 1–2 shift valve 113 thus maintaining the inhibitor valve piston 217 in its uppermost position and maintaining the 1–2 shift valve piston 172 in its low speed position. The conduit 189, as in low range drive, supplies line pressure through the downshift valve 103 and conduit 301 to the land 197 of the 2–3 shift valve piston 192 thus maintaining this piston in its downshifted position, and the connected conduit 228 supplies line pressure to the bottom end of the 1–2 shift valve piston 172 through the ports 222 and 225 of the inhibitor valve, similarly as in low range drive. Line pressure flows from the conduit 301 between the ports 207 and 208 of the 2–3 shift valve 111 and through the conduit 215 and the ports 182 and 183 of the 1–2 shift valve, similarly as in low range drive. The line pressure supplied to the conduit 213 is applied through the ports 274 on the upper end of the orifice control valve piston 258 thus holding this piston in its illustrated position. The line pressure in the conduit 213 is also supplied through the port 201, the groove between the lands 194 and 195 of the 2–3 shift valve 111, the port 211 and the conduit 216 to the piston 63 for the rear clutch 31. The line pressure present at the port 187 of the 1–2 shift valve 113, as in low speed drive, flows into the conduit 281 and through the orifice control valve 112 both to the release cavity 122 of the front brake servo motor 116 and also to the servo motor 124 for the rear brake 33. The brake 32 is thus disengaged; the brake 33 is engaged; and the rear clutch 31 is engaged so as to complete the reverse drive through the transmission.

The conduit 213 carrying line pressure in reverse drive also supplies line pressure through the conduit 327 and port 326 on to the left end of the throttle modulator valve 106, moving the piston 314 of the throttle modulator valve to the limit of its movement to the right so that this valve piston connects together the ports 325, 322 and 324. The throttle pressure in the conduit 311 is thus supplied to both the ports 325 and 324 of the throttle modulator valve and thereby through the conduits 351 and 352 respectively, and the ports 342 and 343 respectively between the lands 334 and 335 and also between the pistons 329 and 330. The throttle pressure is thus more effective in reverse drive on the compensator valve piston 329 than for any of the forward drives, tending to maintain the land 333 blocking the line pressure supply port 346 until a greater governor pressure in the conduit 291 is reached. The compensator pressure in the conduit 350 thus in general for reverse drive is lower than for the forward drives, and therefore, the line pressure in the conduit 140 and the pressure in the converter 29 for reverse drive are higher than for the forward drive. The increased line pressure for reverse drive is necessary particularly since the rear brake 33 must take a higher reaction for the reverse drive than for the low speed forward drive.

My improved transmission controls advantageously cause a shifting of the 1–2 shift valve piston 172 from its intermediate speed drive position to its low speed drive position at different speeds of the vehicle and at different governor pressures in the conduit 291, the 1–2 shift valve piston 172 shifting from its intermediate speed position to its low speed position at higher vehicle speeds when the manual selector valve 102 is in its low range position as compared to its drive range position. The inhibitor valve 109 functions to provide this change in shifting action of the 1–2 shift valve 113, applying under one condition line pressure beneath the relatively large land 177 and under the other condition applying line pressure through the conduit 231 on the land 175 which effectively is relatively small with respect to the land 177, since much of the effectiveness of the land 175 is cancelled by the opposing land 176 only slightly smaller than the land 175. The rear servo check valve 114 advantageously provides a smooth engagement of the rear brake 33 even though the accelerator is in a closed throttle position when a change is made from intermediate to low speed ratio drive. My improved transmission controls advantageously cause the transmission to start in low speed ratio, subsequently upshifts into intermediate speed ratio and finally upshift into high speed ratio, all under governor control, when the transmission controls are used in the drive range position of the selector valve 102.

I wish it to be understood that my invention is not to be limited to the specific constructions and arrangements shown and described, except only insofar as the claims may be so limited, as it will be apparent to those skilled in the art that changes may be made without departing from the principles of the invention.

I claim:

1. In transmission mechanism for an automotive vehicle, the combination of a drive shaft, a driven shaft, means for providing a high speed power train between said shafts, a control element for causing changes between said power trains and having a low speed drive position and a high speed drive position, a hydraulic governor driven from said driven shaft and providing a governor fluid pressure that increases with driven shaft speed and effective on said control element tending to hold the control element from movement from its high speed position to its low speed position, an accelerator for the vehicle, an additional manual control, said control element having large and small lands, a fluid pressure source providing an operating pressure of a predetermined value, valve means under the control of said accelerator for connecting said pressure source and said small land and applying said predetermined operating pressure on said small land when the accelerator is moved to an open throttle position tending to move the control element from its high speed position to its low speed position against the action of said governor pressure, and valve means under the control of said additional manual control for connecting said pressure source and said large land and applying said predetermined operating pressure on said large land tending to move said control element from its high speed position to its low speed position against said governor pressure and causing such movement due to said large land at a higher speed of said driven shaft as compared to the speed at which said small land is effective to move said control element to its low speed position.

2. In transmission mechanism, the combination of drive shaft, a driven shaft, means providing a low speed power train between said shafts, means providing a high speed power train between said shafts, a control element for controlling changes between said power trains and having a low speed drive position and a high speed drive position, a hydraulic governor driven by said driven shaft and providing a fluid pressure that increases with driven shaft speed and effective on said control element tending to hold it from movement from its high speed position to its low speed position, said control element having a relatively large land thereon and a small land thereon, a source of fluid pressure providing a predetermined operating pressure, and a valve for selectively applying the same pressure from said source to one or the other of said lands for applying either a relatively large or a relatively small force on said control element tending to move it from its high speed position to its low speed position against the action of said governor controlled fluid pressure depending on the land to which fluid pressure is applied.

3. In transmission mechanism, the combination of a drive shaft, a driven shaft, means providing a low speed power train between said shafts, means providing a high speed power train between said shafts, a control element for controlling changes in drive between said power trains and having a low speed drive position and a high speed drive position, a hydraulic governor driven by said driven shaft and providing a fluid governor pressure that increases with driven shaft speed and applied on said control element tending to hold the control element from movement from its high speed position to its low speed position, said control element having a large land and a small land thereon, a source of fluid pressure including a supply conduit for providing a predetermined operating pressure, and a selector valve for connecting said supply conduit to one or the other of said lands for thereby moving said control element from its high speed position to its low speed position against the action of said governor pressure at a higher driven shaft speed when the fluid pressure source is connected to said large land or at a lower driven shaft speed when said pressure source is connected to said small sized land.

4. In transmission mechanism for an automotive vehicle, the combination of a drive shaft, a driven shaft, means for providing low and intermediate and high speed power trains between said shafts, means for causing a change of drive from said low to intermediate speed power trains and including a shiftable control element having a low and an intermediate speed position, means for causing a change from said intermediate power train to said high speed power train and including a shiftable control element having an intermediate speed and a high speed position, governor mechanism responsive to the speed of one of said shafts tending to move said control elements from their lower speed positions to their higher speed positions, an accelerator for the vehicle, valve means under the control of said accelerator for providing a throttle pressure that increases with accelerator opening, means connecting said accelerator controlled valve means and one of said control elements to provide a pressure on the control element tending to hold it against movement by said governor mechanism, said connecting means including a pressure reducing valve for reducing the pressure effective on said last-named control element and varying with accelerator opening, and means connecting said two control elements so as to put said reduced pressure varying with accelerator opening also on the other control element tending to hold it also against movement due to said governor mechanism.

5. In transmission mechanism for an automotive vehicle, the combination of a drive shaft, a driven shaft, means for providing low and intermediate and high speed power trains between said shafts, means for causing a change of drive from said low to said intermediate speed power trains and including a shiftable control element having a low speed and an intermediate speed position, means for causing a change of drive from said intermediate speed power train to said high speed power train and including a second shiftable control element having an intermediate speed and a high speed position, a hydraulic governor driven from said driven shaft and providing a fluid governor pressure that increases with the speed of said driven shaft and which is applied on said shiftable control elements tending to move each of them from its lower speed position to its higher speed position, an accelerator for the vehicle, valve means under the control of said accelerator for providing a throttle pressure that increases with accelerator opening, means for connecting said accelerator controlled valve means with said second shiftable control element to provide a pressure on the control element tending to hold it against movement by said governor and including a pressure reducing valve reducing the pressure applied on the shiftable control element to a predetermined value less than the throttle pressure from said valve means, and conduit means connecting said two shiftable control elements for supplying the same throttle pressure as reduced by said reducing valve onto said first-named control element for opposing the action of said governor fluid pressure on said first-named control element.

6. In transmission mechanism for an automotive vehicle, the combination of a drive shaft, a driven shaft, means providing low and intermediate and high speed power trains between said shafts, means for changing from said low to said intermediate speed power train and including a shiftable control valve having a low speed and an intermediate speed position, means for changing from said intermediate speed power train to said high speed power train and including a second shiftable control valve having an intermediate speed and a high speed position, a hydraulic governor driven by said driven shaft and providing a governor fluid pressure that increases with the speed of said driven shaft and which is applied on said control valves tending to move them from their lower speed to their higher speed positions, an accelerator for the vehicle, valve means under the control of said accelerator for providing a throttle pressure that increases with accelerator opening, means hydraulically connecting said accelerator controlled valve means and said second control valve effective for putting a fluid pressure on the control valve opposing said governor fluid pressure, said last-named means including a pressure reducer valve providing a throttle pressure on said last-named control valve less by a predetermined value than the throttle pressure and having throttle pressure applied on one end and said reduced pressure applied on the other end, and a conduit for connecting said two control valves for supplying said reduced throttle pressure also on said first-named control valve such that the reduced throttle pressure opposes the action of the hydraulic governor pressure.

7. In transmission mechanism for an automotive vehicle, the combination of a drive shaft, a driven shaft, means for providing a relatively low speed power train between said shafts, means for providing a relatively high speed power train between said shafts, a friction engaging device for completing each of said power trains, a fluid pressure operated motor for disengaging said friction device for said high speed power train, a fluid pressure operated motor for engaging said friction device for said low speed power train, a source of fluid pressure, means for connecting said pressure source to said first-named motor for disengaging said friction device for said high speed train, valve means under the control of the pressure applied to said first-named motor for connecting said second-named motor and said fluid pressure source when the pressure on said first-named motor reaches a predetermined value, additional valve means between said pressure source and said second-named motor in one position providing a restricted flow to said second-named motor and in another position providing an unrestricted flow to said motor, an accelerator for the vehicle, valve means under the control of said accelerator for providing a throttle pressure that increases with throttle opening, and conduit means connecting said additional valve means with said accelerator controlled valve means for applying said throttle pressure on said additional valve means so that said additional valve means is in its fluid flow restricting position when said accelerator is in a closed throttle position and is in its fluid flow non-restricting position when said accelerator is in an open throttle position.

8. In transmission mechanism, the combination of a drive shaft, a driven shaft, means for providing low and intermediate and high speed power trains between said shafts, a control element for causing a shift from the low speed power train to the intermediate speed power train and having a low speed position and an intermediate drive position, a second control element for causing a shift from said intermediate speed power train to said high speed power train and having an intermediate drive position and a high speed position, and a hydraulic governor driven by one of said shafts for providing a fluid governor pressure on each of said control elements tending to move the control element from its relatively low speed position to its relatively high speed position, said governor comprising a valve substantially radially disposed with respect to and carried by said one shaft, said valve having a land uncovering a port to thereby transmit fluid pressure through the valve to said two control elements and having another land subject to the fluid pressure applied to said control elements tending to move said land across said first-named port to close the latter, a weight carried by said valve, and a spring effectively between said valve and weight and allowing radially outward movement of said weight under the action of centrifugel force with respect to said valve and transmitting centrifugel force on the weight to the valve to move it to uncover said port.

9. In a transmission mechanism for an automotive vehicle, the combination of a drive shaft; a driven shaft; means for providing a power train between said shafts and including a friction engaging device for completing the power train; a fluid pressure operated motor for engaging the friction device; a source of fluid pressure; an accelerator controlling a throttle for the vehicle; first valve means under the control of said accelerator for providing a throttle pressure that increases with throttle opening; second valve means having two operative positions and effectively disposed between said motor and said pressure source, in a first position restricting the flow of fluid between said source and said motor, and in a second position providing a substantially unrestricted flow of fluid; a spring acting on said valve means and tending to hold said valve means in its first position; and means for applying throttle pressure to said second valve means for tending to move said valve means in opposition to said spring from its first position when the accelerator is in a closed throttle position to its second position when the accelerator is in an open throttle position.

References Cited in the file of this patent
UNITED STATES PATENTS

| | | |
|---|---|---|
| 2,645,135 | Frank | July 14, 1953 |
| 2,667,085 | Ackerman | Jan. 26, 1954 |
| 2,740,304 | Sheppard | Apr. 3, 1956 |
| 2,788,678 | Sheppard | Apr. 16, 1957 |

Disclaimer 2,893,261.—*George E. Flinn*, Muncie, Ind. TRANSMISSION. Patent dated July 7, 1959. Disclaimer filed Aug. 26, 1964, by the assignee, *Borg-Warner Corporation*.

Hereby enters this disclaimer to claims 1, 2, 3 and 9 of said patent.
[*Official Gazette December 1, 1964.*]

Notice of Adverse Decision in Interference

In Interference No. 91,918 involving Patent No. 2,893,261, G. E. Flinn, Transmission, final judgment adverse to the patentee was rendered Nov. 2, 1964, as to claims 1 and 9.

[*Official Gazette December 22, 1964.*]